United States Patent [19]
Sano et al.

[11] Patent Number: 5,977,494
[45] Date of Patent: Nov. 2, 1999

[54] SYMMETRICALLY MOUNTED SWITCHES ON STEERING WHEEL COLUMN BODY INCLUDING WIRING CONNECTION AND CONTROL UNIT

[75] Inventors: Yukiharu Sano; Hidetaka Ito, both of Shizuoka, Japan

[73] Assignee: Yazaki Corporation, Tokyo, Japan

[21] Appl. No.: 08/699,409

[22] Filed: Aug. 19, 1996

[30] Foreign Application Priority Data

| Sep. 8, 1995 | [JP] | Japan | .................................. 7-231550 |
| Jan. 30, 1996 | [JP] | Japan | .................................. 8-013758 |
| Jun. 3, 1996 | [JP] | Japan | .................................. 8-140376 |

[51] Int. Cl.⁶ .................................................. H01H 9/00
[52] U.S. Cl. ................................................... 200/61.54
[58] Field of Search .................... 200/61.27, 61.38, 200/61.54–61.57, 293–307, 329, 345

[56] References Cited

U.S. PATENT DOCUMENTS

| 3,766,351 | 10/1973 | Cryer | ............................ 200/61.27 X |
| 3,873,788 | 3/1975 | Machalitzky et al. | ............... 200/61.27 |
| 3,892,932 | 7/1975 | Erdelitsch et al. | .................... 200/61.27 |
| 4,277,658 | 7/1981 | Delp et al. | ............................ 200/61.54 |
| 4,293,743 | 10/1981 | Iwata et al. | ...................... 200/61.27 X |
| 4,327,264 | 4/1982 | Botz et al. | ............................... 200/295 |
| 4,404,438 | 9/1983 | Honjo | .................................... 200/61.54 |
| 4,739,130 | 4/1988 | Roller et al. | ........................... 200/61.27 |
| 5,182,423 | 1/1993 | Botz et al. | ............................. 200/61.27 |
| 5,459,294 | 10/1995 | Danielson | ............................. 200/61.54 |
| 5,575,177 | 11/1996 | Poleschuk et al. | .................... 74/484 R |
| 5,606,156 | 2/1997 | Mahr et al. | ........................... 200/61.54 |
| 5,670,765 | 9/1997 | Yokoyama et al. | .................. 200/61.54 |
| 5,747,763 | 5/1998 | Uchiyama et al. | ................... 200/61.54 |

FOREIGN PATENT DOCUMENTS

| 5-41941 | 6/1993 | Japan | .............................. B60K 37/06 |

*Primary Examiner*—J. R. Scott
*Attorney, Agent, or Firm*—Sughrue, Mion, Zinn, Macpeak & Seas, PLLC

[57] ABSTRACT

A combination switch device for use in conjunction with an automobile steering column. The device has a switch body into which at least one lever switch is engage so that it may be easily detached from the body. To this end, the lever switch includes at joining-side electrical terminal for electrically connecting the lever switch to a wiring and connecting means which is fixedly incorporated into the switch body when the lever switch is engaged with the switch body. The wiring and connecting means is formed of bus bars integral to the switch body. The combination switch also includes a control unit which is electrically connected to the wiring and connecting means for receiving output signals from the lever switch. The control unit is electrically connected to the lever switch through the wiring and connecting means and joining-side connecting terminals when the lever switch is engaged in the switch body.

13 Claims, 19 Drawing Sheets

SYMMETRICALLY MOUNTED SWITCHES ON STEERING WHEEL COLUMN BODY INCLUDING WIRING CONNECTION AND CONTROL UNIT

FIELD OF THE INVENTION

This invention relates to a combination switch device in which lever switches are detachably engaged with the body of the device.

DESCRIPTION OF THE PRIOR ART

In the field of an automobile, a recent tendency is to electronically design electric devices in an automobile thereby to decrease the weight of the automobile (for instance, a multi-communication system is provided for an automobile). As a part of this tendency, research has been conducted on the electronically designing of a combination switch device which is mounted in the vicinity of the steering wheel column of an automobile to control lights, wipers, etc. A conventional combination switch device of this type is as shown in FIG. 19.

FIG. 19 is an exploded sectional top view of the conventional combination switch device. The conventional combination switch device 1 comprises: a turn lever switch 3 for operating head lamps, turn lamps, etc.; a wiper lever switch 5 for operating wipers, washers, etc.; a device body 7 through which a steering shaft is extended; and a control unit 9 including a control circuit.

The turn lever switch 3 and the wiper lever switch 5 are substantially conical. Those switches 3 and 5 comprise: operating levers 3a and 5a which the operator swings about the fulcrums at the base end portions thereof through the outer end portions; and switch sections 3b and 5b which are changed in connection state as the operating levers 3a and 5a are swung in the above-described manner, respectively. The turn lever switch 3 and the wiper lever switch 5 further comprise knob switch sections of push button type (not shown) provided inside the operating levers 3a and 5a, respectively. For convenience in the maintenance of the device, the turn lever switch 3 and the wiper lever switch 5 are provided as individual components (units) which are separable from the device body; that is, they are inserted into the device body 7 from both sides (right and left), and secured with tapping screws (not shown). On the other hand, the control unit 9 is provided on the side of the engine (the lower side of FIG. 19) compared with the turn lever switch 3 and the wiper lever switch 5.

The turn lever switch 3 and the wiper lever switch 5 are electrically connected to the control unit 9 as follows: That is, the switches 3 and 5 are connected to the control unit 9 through connectors 15 and 17 connected to lead wires extended from the aforementioned lever switch sections 3b and 5b and through connectors 19 and 21 connected to lead wires extended from the knob switch sections, respectively.

A clock spring 23 is an individual component which is separable from the combination switch device 1, and is secured to the upper surface of the device body 7 with screws.

In the above-described conventional combination switch device 1, the turn lever switch 3 and the wiper switch body 5 are mechanically secured to the device body 7, while those switches 3 and 5 are electrically connected to the control unit 9, and the output signals of the switches are applied through the lead wires and the connectors 15, 17, 19 and 21 to the control unit 9. Hence, the conventional device is disadvantageous in that it is large in the number of connectors, and it is rather difficult to insert the connectors into the switch body 7, and it is large in the number of assembling steps.

In addition, it should be noted that the clock spring 23 is provided as an individual component which is separable from the combination switch device 1, which increases the number of components as much, thus obstructing a reduction in manufacturing cost of the device.

SUMMARY OF THE INVENTION

In view of the foregoing, an object of the invention is to provide a combination switch device which, when compared with a conventional combination switch device, is reduced in the number of components, and is accordingly assembled with high work efficiency, and reduced in manufacturing cost.

According to the present invention, there is provided a combination switch device comprising: a device body incorporating wiring and connecting means; and at least one lever switch incorporating a joining-side connecting terminal and being detachably engaged with the device body, the joining-side contact terminal being electrically connected to the wiring and connecting means when the lever switch is engaged with the device body.

The combination switch device may comprise a control unit connected to the wiring and connecting means.

The device body may include a clock spring.

And the lever switch may include a knob switch section and a lever switch mechanism which are electrically connected through the joining-side connecting terminal to the wiring and connecting means.

Further, the device body may include a pair of accomodating sections formed on both sides of a steering wheel shaft so as to be symmetrical with respect to the device body and a pair of symmetrical lever switches are engaged with the accomodating sections.

Furthermore, a receiving-side connecting terminal may be formed on the control unit and in this case, the joining-side connecting terminal is connected to the receiving-side connecting terminal in such a manner that the joining-side connecting terminal slides on the receiving-side connecting terminal when the lever switch is engaged with the device body.

In the combination switch device of the invention, the wiring bus bars are built in the device body, and the control unit is connected to the bus bars, so that, when the lever switches are coupled to the device body, the joining-side connecting terminals are automatically electrically connected to the bus bars. Therefore, the mechanical joining of the switch levers to the device body, and the electrical connecting of the lever switches to the control unit are achieved at the same time. Hence, the combination switch device of the invention, compared with the conventional one, is high in assembling efficiency, small in the number of components, and low in manufacturing cost.

In the combination switch device in which the clock spring is made integral with the device body, the number of components is further reduced.

Furthermore, in the combination switch device in which the knob switch section and the lever switch mechanism are electrically connected to the bus bars through the joining-side connecting terminals, the electrical connection of the lever switch can be achieved only by the engagement of the lever switch with the device body.

Furthermore, in the combination switch device in which a pair of lever switches are formed symmetrical with respect to the device body, the right and left steering wheel components can be used commonly.

In addition, in the combination switch device in which the receiving-side connecting terminals are formed on the circuit board of the control unit, it is unnecessary to provide the receiving-side connecting terminals as individual components, because the receiving-side connecting contacts are integral with the circuit board of the control unit. Hence, the number of components is reduced as much.

DETAILED DESCRIPTION OF THE PREFERRED EMBODIMENTS

Figure 1:
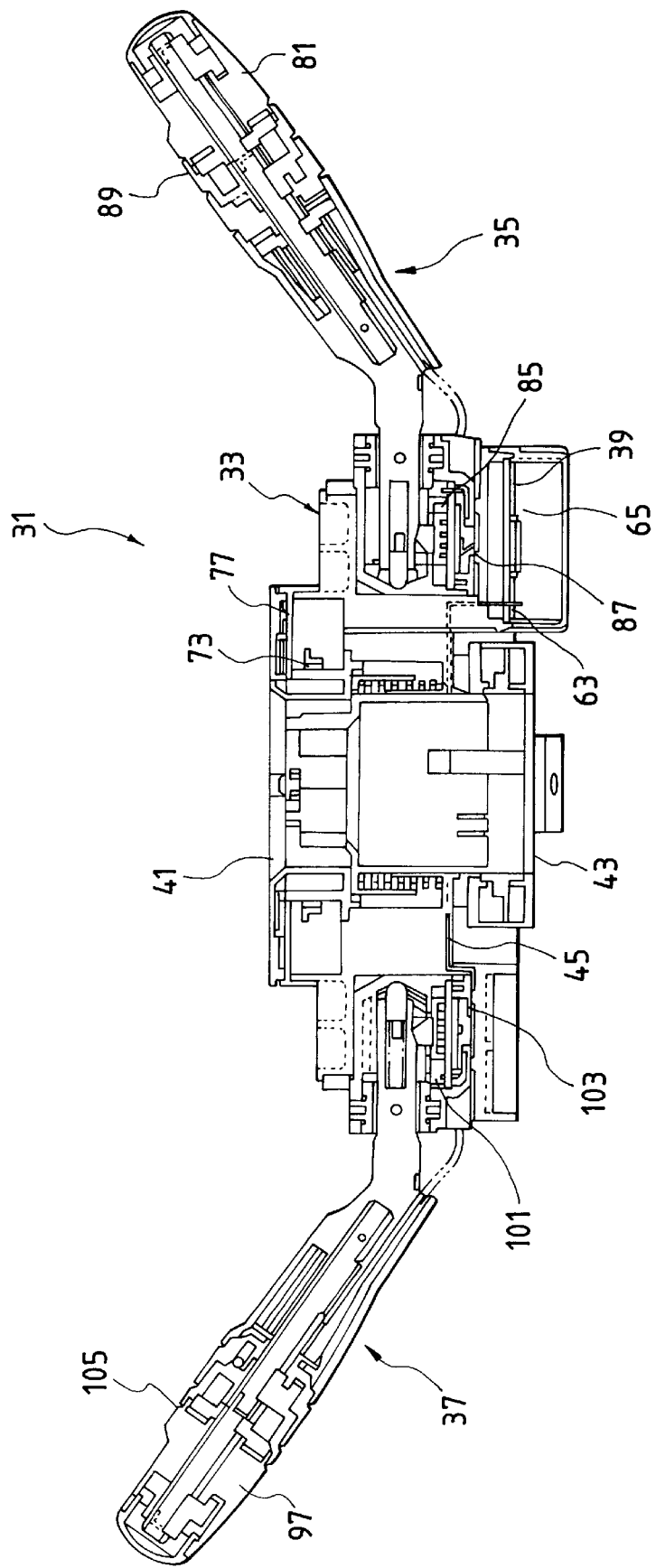
FIG. 1 is a sectional top view of an example of a combination switch device, which constitutes a first embodiment of the invention.
Figure 2:
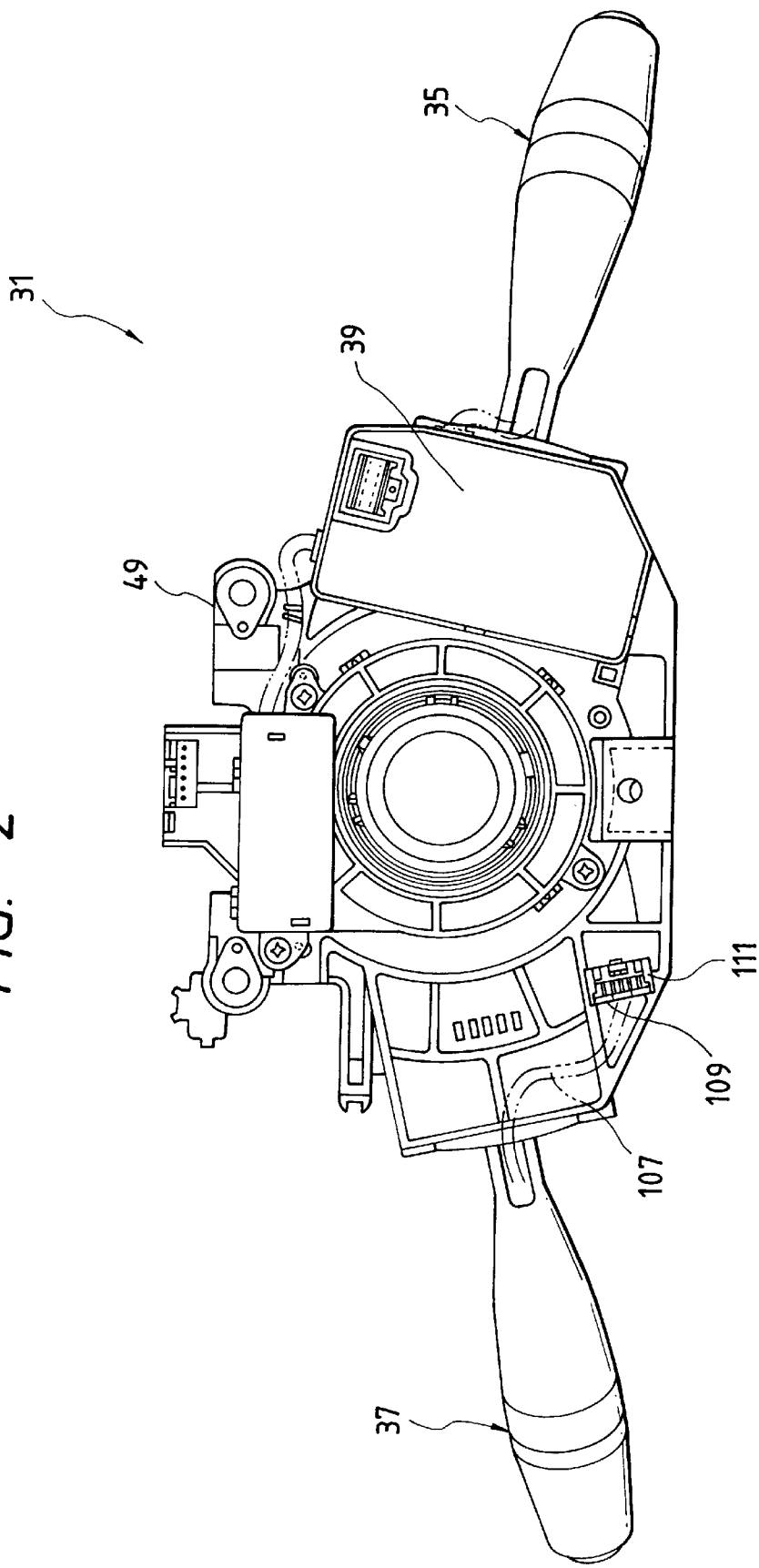
FIG. 2 is a front view of the combination switch device shown in FIG. 1.
Figure 3:
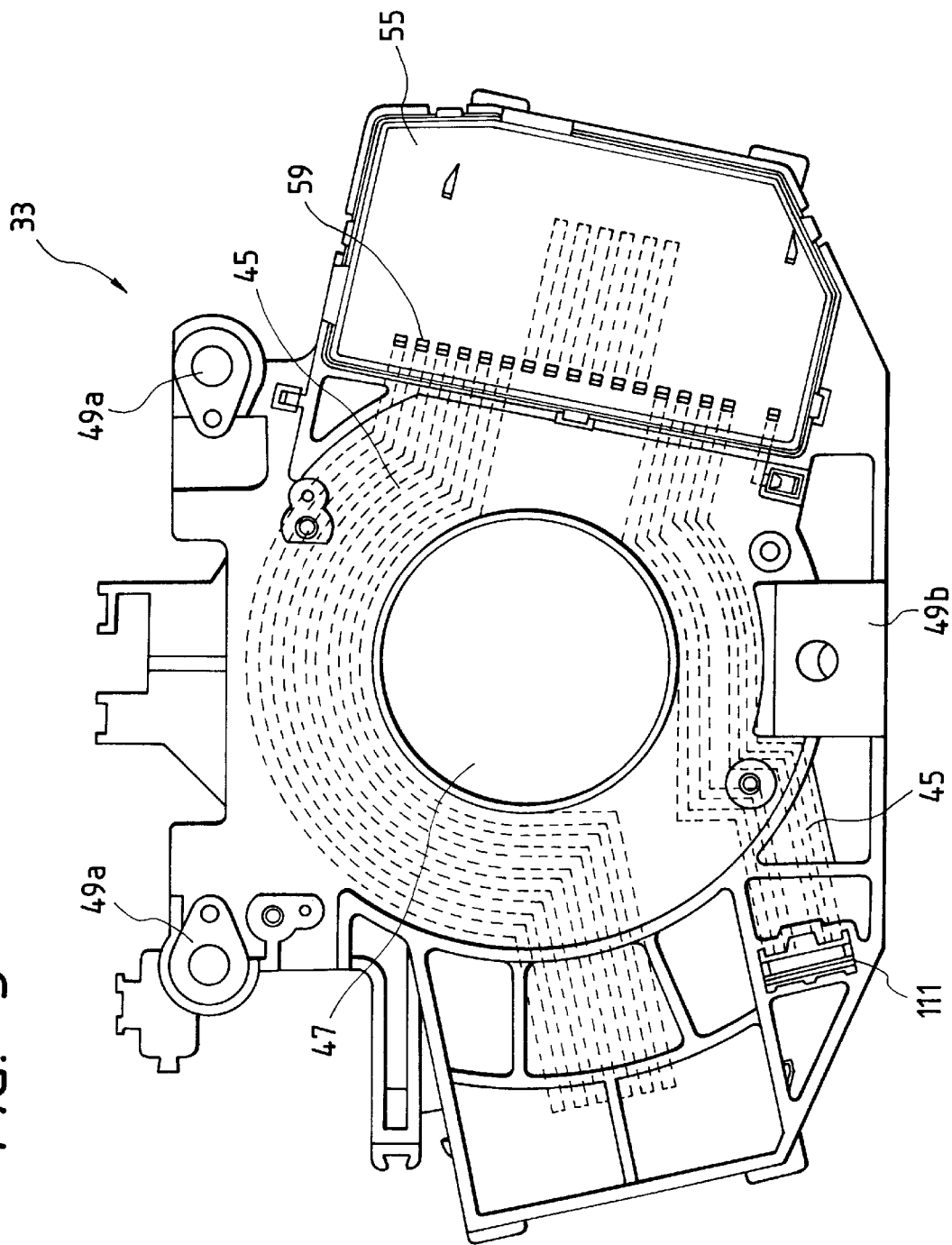
FIG. 3 is a front view of a device body shown in FIG. 1.
Figure 4:
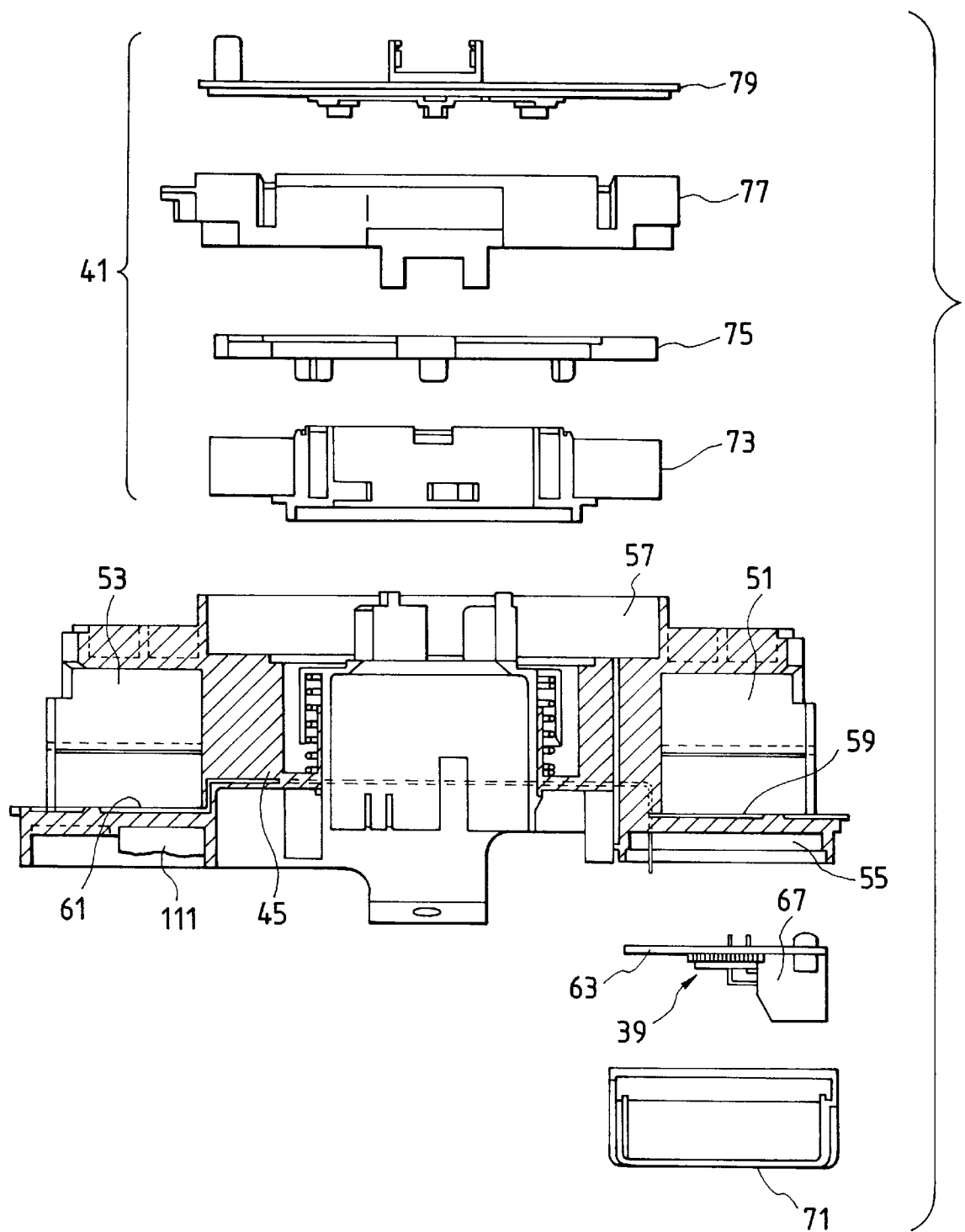
FIG. 4 is an exploded sectional view showing the device body and its relevant components.
Figure 5:
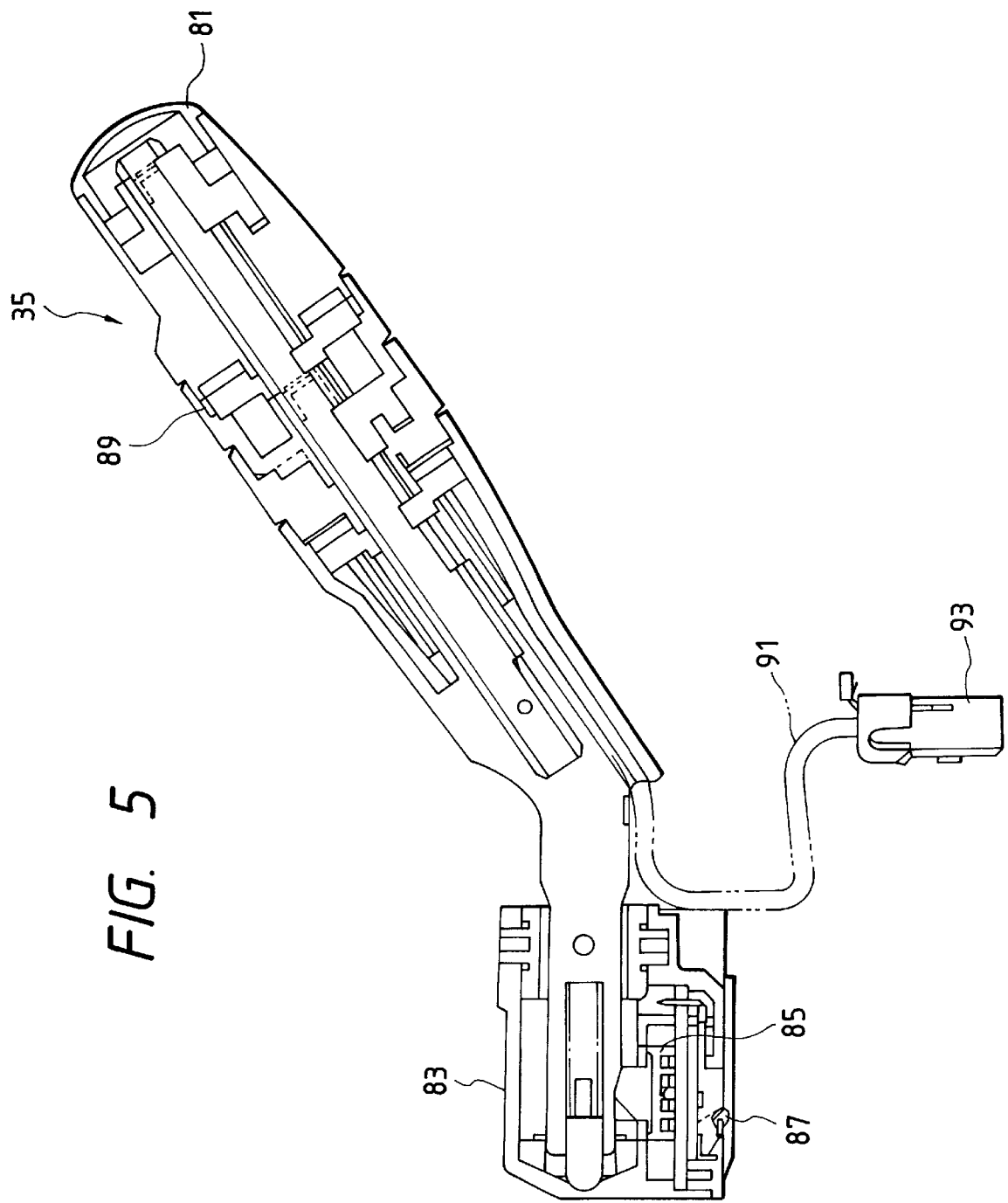
FIG. 5 is an enlarged sectional top view of a fist lever switch shown in FIG. 1.
Figure 6:
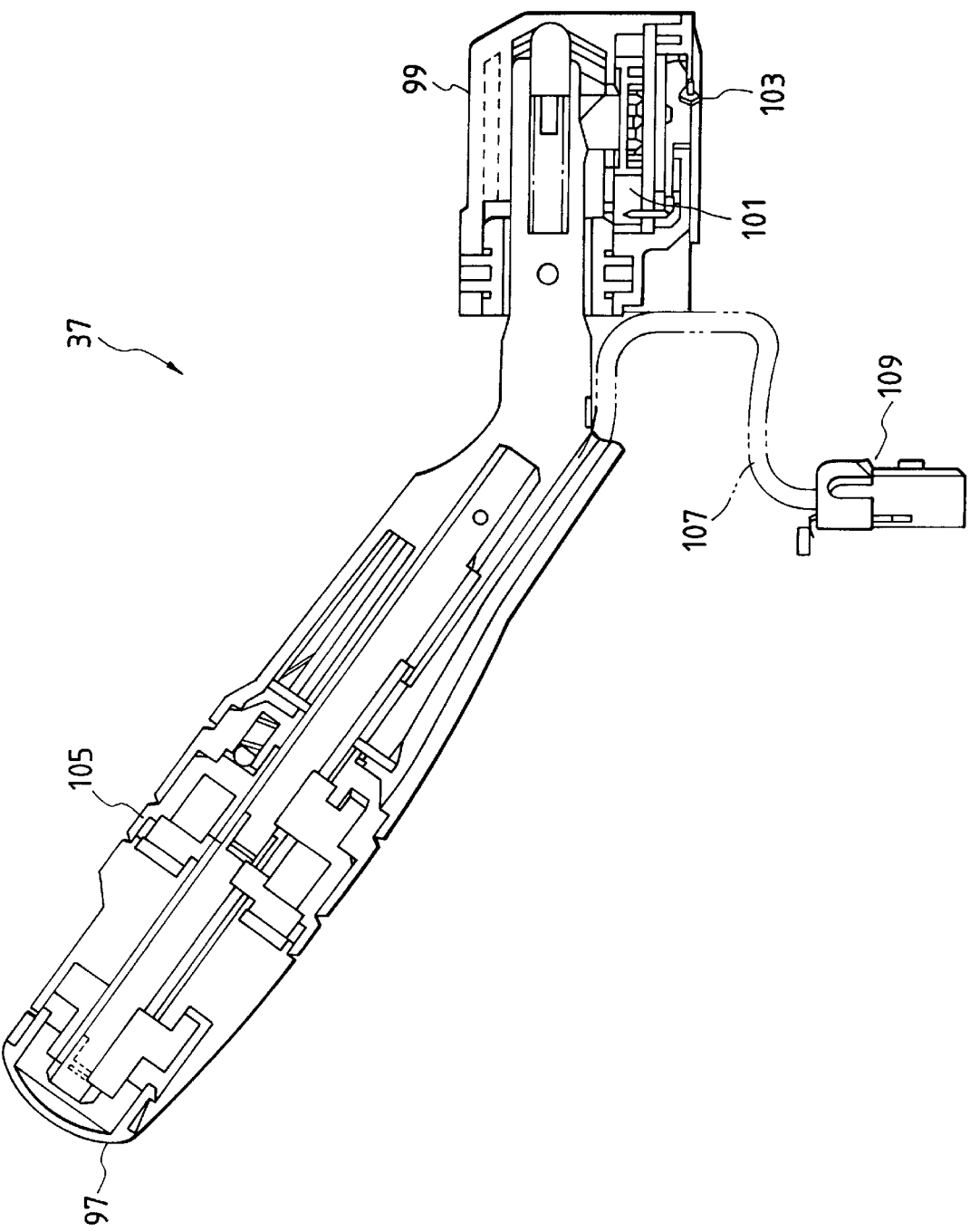
FIG. 6 is an enlarged sectional top view of a second lever switch shown in FIG. 1.

Preferred embodiments of the invention will be described with reference to the accompanying drawings in detail.
1st Embodiment FIG. 1 is a sectional view showing an example of a combination switch device, which constitutes a first embodiment of the invention. FIG. 2 is a front view of the combination switch device shown in FIG. 1. FIG. 3 is a front view of a switch body shown in FIG. 1. FIG. 4 is an exploded sectional view of components concerning the switch body 4. FIG. 5 is an enlarged sectional top view of a first lever switch shown in FIG. 1. FIG. 6 is an enlarged sectional top view of a second lever switch shown in FIG. 1.

The combination switch device 31, the first embodiment of the invention, is generally indicated in FIG. 1. The combination switch device 31 (hereinafter referred to merely as "a device 31", when applicable), as shown in FIG. 1, comprises: a device body 33 which the steering shaft penetrates, first and second lever switches 35 and 37 which are engaged with device body 33; a control unit (ECU) provided on the engine room side of the device body 33; and a clock spring 41 provided on the cabin side of the device body 33. In addition, the device 31 may have a steering sensor 43 adapted to convert the rotation angle of the steering wheel into an electrical signal.

The lower half side of FIG. 1 corresponds to the engine room side, and the upper half to the cabin side. Hence, the external appearance of the device 31 as viewed from the engine room side is as shown in FIG. 2.

As shown in FIGS. 3 and 4, the device body 33 comprises bus bars 45 formed therein by insert-molding; a steering shaft penetrating section 47 substantially at the center, a upper column unit mounting section 49a and a lower column unit mounting section 49b in combination; a first switch assembly accommodating section 51 on the right side; a second switch assembly accommodating section 53 on the left side; a control unit accommodating section 55 on the engine room side; and a clock spring accommodating section 57 on the cabin side.

The bus bars are extended to the right, thus forming first receiving-side connecting terminals 59 below the first switch assembly accommodating section 51, and to the left, thus forming second receiving-side connecting terminals 61 below the second switch assembly accommodating section 53. The bus bars 45 are further extended into the control unit accommodating section 55, and connected to a connecting section 63 formed on the substrate of the control unit 39, to apply the output signals of the switches to a control circuit section 65 formed on the substrate. The control circuit section 65 is to perform electronic control such as multiplex communication with external electronic units. A control-unit-side connector 67 coupled to the control circuit section 65 is electrically connected to the first lever switch 35. As is apparent from the above description, the signal transmission is carried out mainly through the bus bars 45, so that the wiring board of the control unit 39 can be miniaturized as much. The control unit 39 is fixedly accommodated in the control unit accommodating section 55, and is then covered with a 71.

The clock spring 41 is interposed between auxiliary equipment (such as a horn switch, steering switch, audio equipment and inflator) on the steering side and wire harnesses on the vehicle body side, to absorb the rotation of the steering wheel. The clock switch 41 comprises an FFC section 73, adaptor 75, cover 77, and adaptor 79 laid one after another in the stated order. The clock switch 41 is accommodated in the clock switch accommodating section 57.

For convenience in maintenance, the first lever switch 35, as shown in FIG. 5, is provided as an individual component (unit) which is separable from the device body 33. The first lever switch 35 comprises: an operating lever 81 which is substantially conical; and a first switch assembly 83 in which a first lever switch mechanism 85 is provided. The latter 85 includes first joining-side connecting terminals 87 which are slightly protruded from the first switch assembly 83.

The portion of the operating lever 81 which is near the front end thereof is pivotally supported in the first switch assembly 83. When the operator moves the operating lever 81 upwardly and downwardly, and forwardly and backwardly with respect to the supporting point, the front end of the operating lever 81 is swung inside the first switch assembly 83, to switch the connecting state of the first lever switch mechanism 85. The connecting state of the latter 85 is transmitted through the first joining-side connecting terminals 87 to the bus bars 45 (as described later).

Inside the operating lever 81, a push-button type or rotary type first knob switch section 89 is provided. When the operator operates the first knob switch section 89, the connecting state of the latter 89 is switched, whereupon a signal is produced. The signal thus produced is applied through a lead wire 91 and a first knob switch connector 93 to the control-unit-side connector 67 (cf. FIG. 4).

In practice, the first lever switch 35 is, for instance, a turn lever switch; and the first lever switch mechanism 85 is, for instance, a-turn switch mechanism, passing switch mechanism, or a dimmer switch mechanism; and the first knob switch section 89 is, for instance, a lighting switch.

For convenience in maintenance, the second lever switch 37, as shown in FIG. 6, is provided as an individual component (unit) which is separable from the device body 33. The second lever switch 37 comprises: an operating lever 97 which is substantially conical; and a second switch assembly 99 in which a second lever switch mechanism 101 is provided. The latter 101 includes second joining-side connecting terminals 103 which are slightly protruded from the second switch assembly 99.

The portion of the operating lever 97 which is near the front end thereof is pivotally supported in the second switch assembly 99. When the operator moves the operating lever 97 upwardly and downwardly, and forwardly and backwardly with respect to the supporting point, the front end of the operating lever 97 is swung inside the second switch assembly 99, to switch the connecting state of the second lever switch mechanism 101. The connecting state of the latter 101 is transmitted through the second joining-side connecting terminals 103 to the bus bars 45 (as described later).

Inside the operating lever 97, a push-button type or rotary type second knob switch section 105 is provided. When the operator operates the second knob switch section 105, the connecting state of the latter 105 is switched, whereupon a signal is produced. The signal thus produced is applied through a lead wire 107 and a second knob switch connector 109 to the body-side-side connector 111 (cf. FIG. 2).

In practice, the second lever switch 37 is, for instance, a wiper/washer switch; and the second lever switch mechanism 101 is, for instance, a wiper switch mechanism; and the second knob switch section 105 is, for instance, a rear wiper/washer switch.

The combination switch device 31 thus constructed is assembled as follows:

First, the first and second lever switches 35 and 47 are slidably inserted into the first and second switch assembly accommodating sections 51 and 53 (cf. FIG. 4) of the device body 33 in which the bus bars have been provided by insert-molding, and the formers 35 and 47 are combined with the latter 51 and 53 with screws. As a result, the first and second receiving-side connecting terminals 59 and 61 are brought into contact with the first and second joining-side connecting terminals 87 and 105 (cf. FIGS. 5 and 6) of those lever switches, so that the first and second lever switches 35 and 37 (such as a turn, passing, dimmer, wiper, washer and mist switch) are electrically connected to the bus bars 45. That is, when the first lever switch 35 and the second lever switch 37 is slidably inserted into the device body 33 from right and left, they are mechanically fixed, and the electrical connection of them is substantially achieved. This means that the combination switch device of the invention can be not only assembled but also serviced with high work efficiency.

Next, the first and second knob switch connectors 93 and 109 connected to the ends of the lead wires 91 and 107 of the first and second knob switch sections 89 and 105 (such as a light switch, and a rear wiper/washer switch) are engaged with the control-unit-side connector 67 and the body-side connector 111, respectively. Thus, all the switches have been connected to the control unit 39.

In this case, the control unit 39 is fixedly mounted in the control unit accommodating section 55 of the device body 33, for instance, by soldering (or by connecting the terminals). The control unit 39 may include an input connector which receives the output signal of the steering sensor 43 (cf. FIG. 1) mounted on the device body 33. That is, in response to the signal from the steering sensor 43, the control unit 39 is able to electrically perform a turn canceling operation.

After the first and second lever switches 35 and 37 have been joined to the device body, clock spring components (the FFC section 73, the adapter 75, the cover 77, and the adaptor 79) are set in the clock spring accommodating section 57. Thus, the clock spring 41 is made integral with the combination switch device 31.

In the combination switch device 31 thus constructed, the bus bars 45 having wiring and connecting functions are built in the device body 33, and are connected to the control unit 39, and simultaneous when the first and second lever switches 35 and 37 are coupled to the device body 33, the first and second joining-side connecting terminals 87 and 103 are electrically brought into contact with the bus bars 45. Hence, the mechanical joining of the first and second lever switches 35 and 37 to the device body 33, and the electrical connecting of those lever switches 35 and 37 to the control unit 39 can be achieved at the same time. This feature contributes to an improvement in the assembling efficiency of the device, and to a reduction in the number of components and accordingly in manufacturing cost.

Furthermore, in the above-described combination switch device 31, the clock spring 41 is provided integral with the device body 33. This feature dispenses with the employment of the clock spring components, and decreases the number of components in the device.

Figure 7:
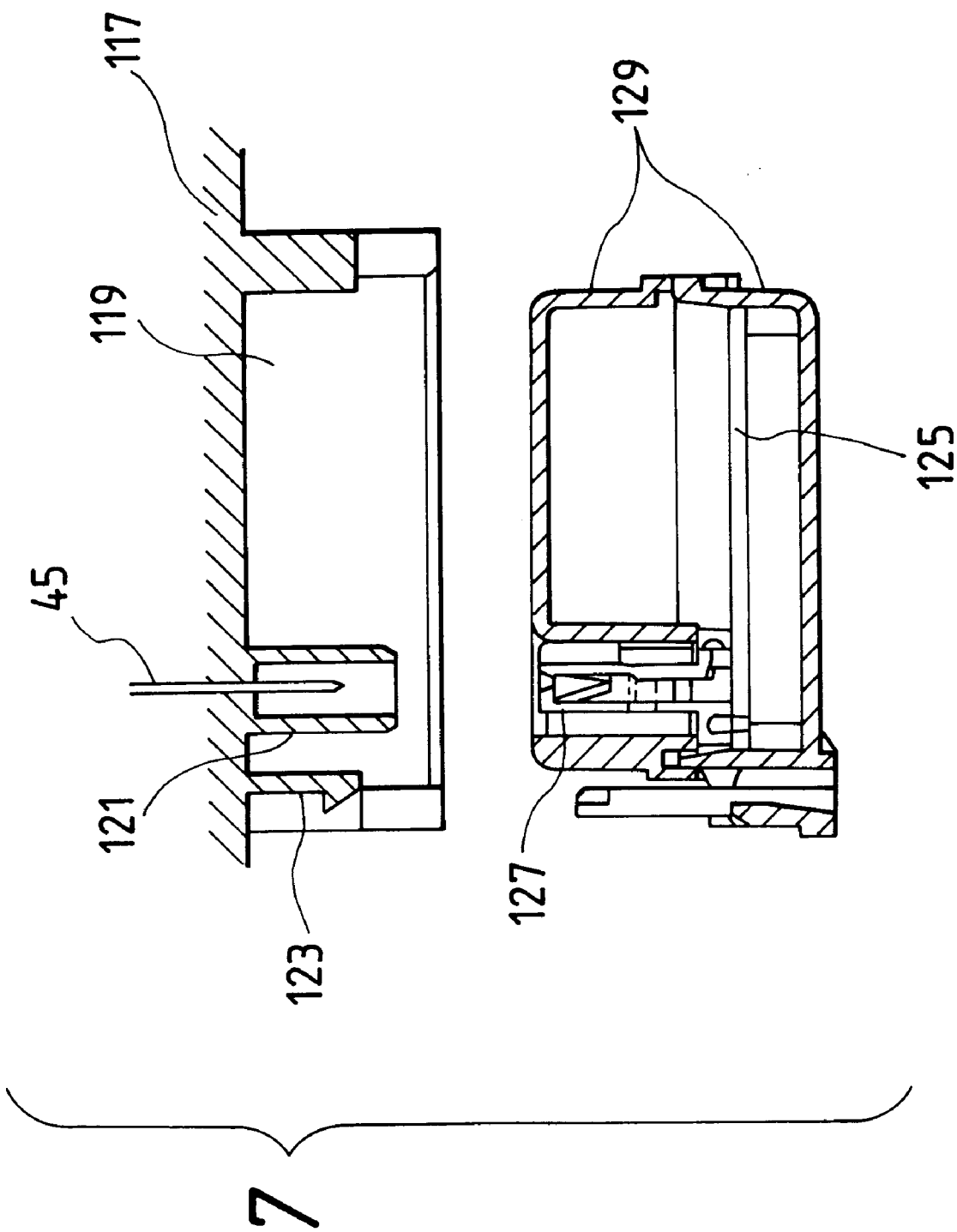
FIG. 7 is a sectional view showing essential components of one modification of the combination switch device shown in FIG. 1.

For convenience in maintenance, the device may be so modified that the control unit 39 is detachably mounted on the device body. FIG. 7 is a sectional view showing essential parts of one modification of the above-described combination switch device in which the control unit 39 is provided separable from the device body 33; that is, it is detachably mounted on the latter 33.

In the modification, as shown in FIG. 7, a connector section 121 is protruded from a control unit accommodating section 119 which is formed in the body 117 of the combination switch device, and the bus bars 45 are buried in the connector section 121. In addition, a locking piece 123 is extended from the control unit accommodating section 119.

In FIG. 7, reference numeral 129 designates an ECU casing which accommodates an ECU 125, and has a connector 27 which is electrically connected to the ECU 125. When the ECU casing 129 is engaged with the control unit accommodating section 119, the locking piece 123 fixedly locks the ECU casing 129, and simultaneously the bus bars 45 are connected to the connector 127.

As was described above, since the ECU 125 is detachably coupled to the device body, the maintenance, replacement and repair of the ECU 125 can be achieved with ease.

2nd Embodiment

Now, another example of the combination switch device, which constitutes a second embodiment of the invention, will be described with reference to FIGS. 8 to 11 in which parts corresponding functionally to those already described with reference to FIGS. 1, 2, 5 and 6 are therefore designated by the same reference numerals or characters.

Figure 8:
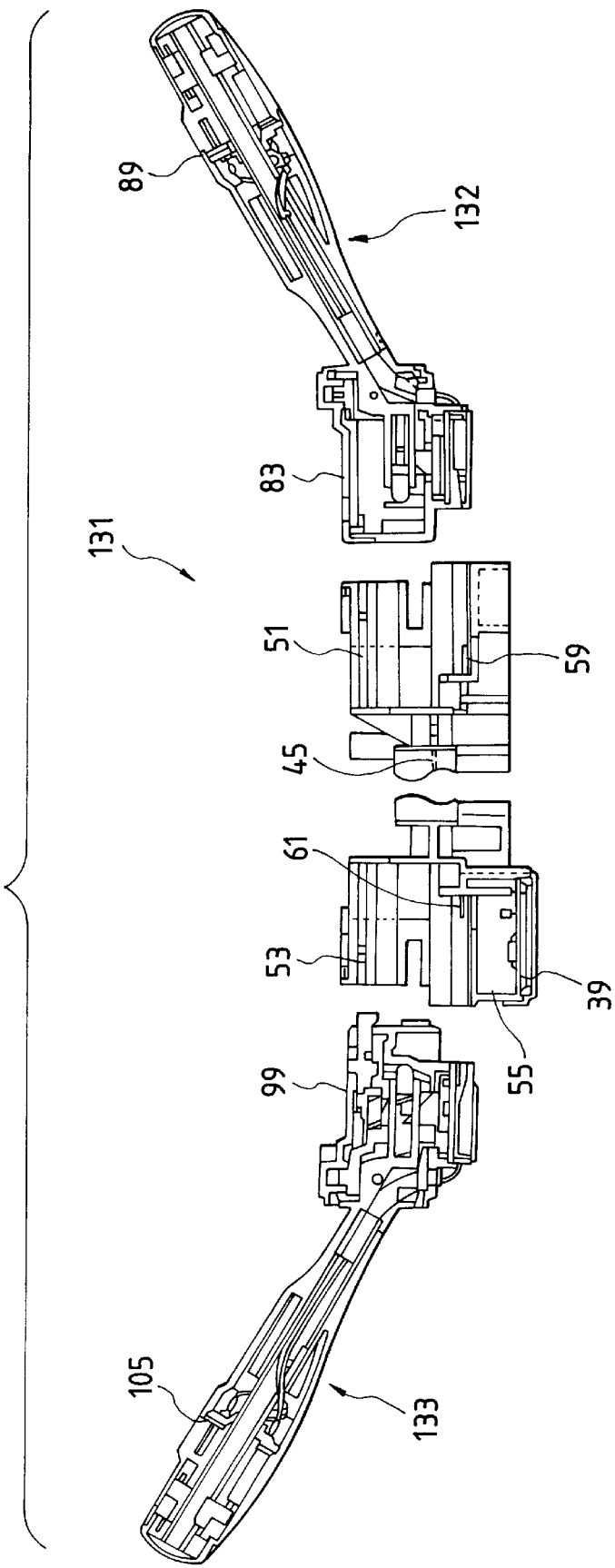
FIG. 8 is a sectional top view of another example of the combination switch device, which constitutes a second embodiment of the invention.
Figure 9:
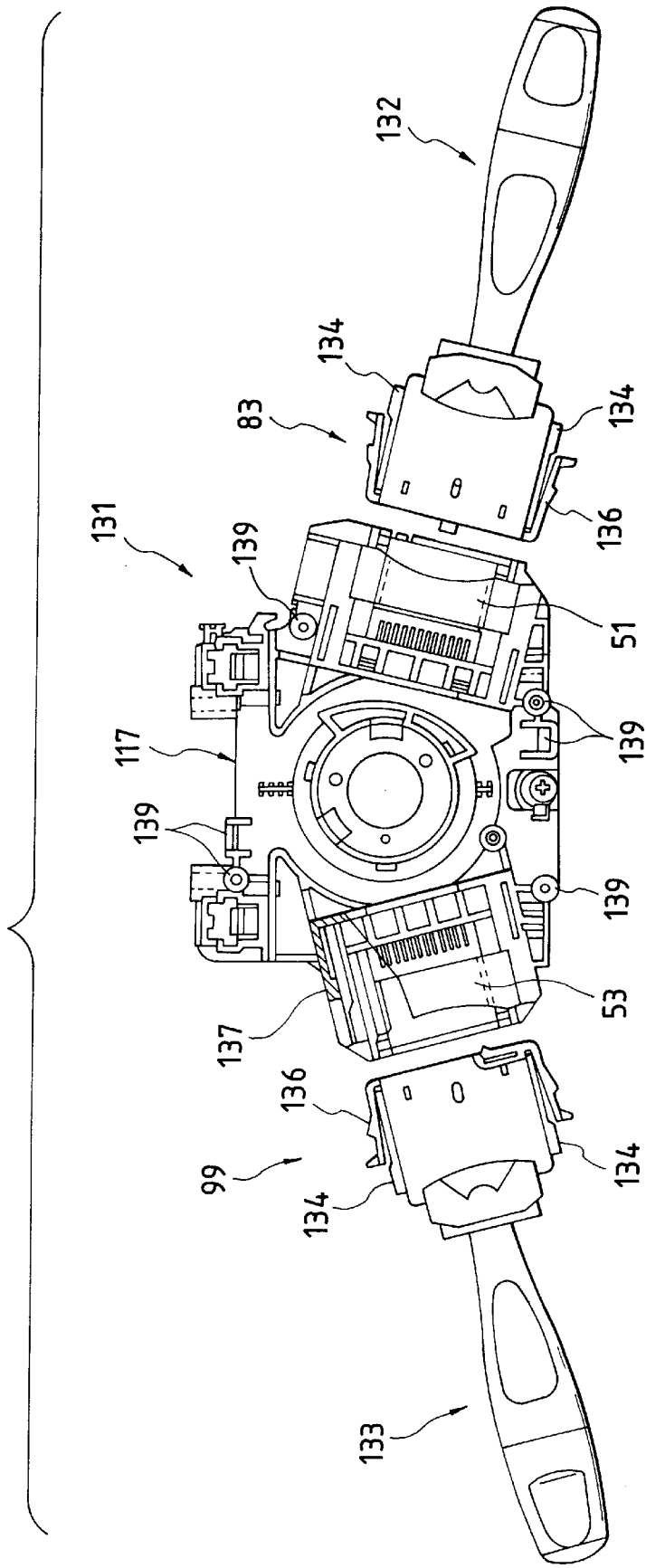
FIG. 9 is a front view of the combination switch device shown in FIG. 8.
Figure 10:
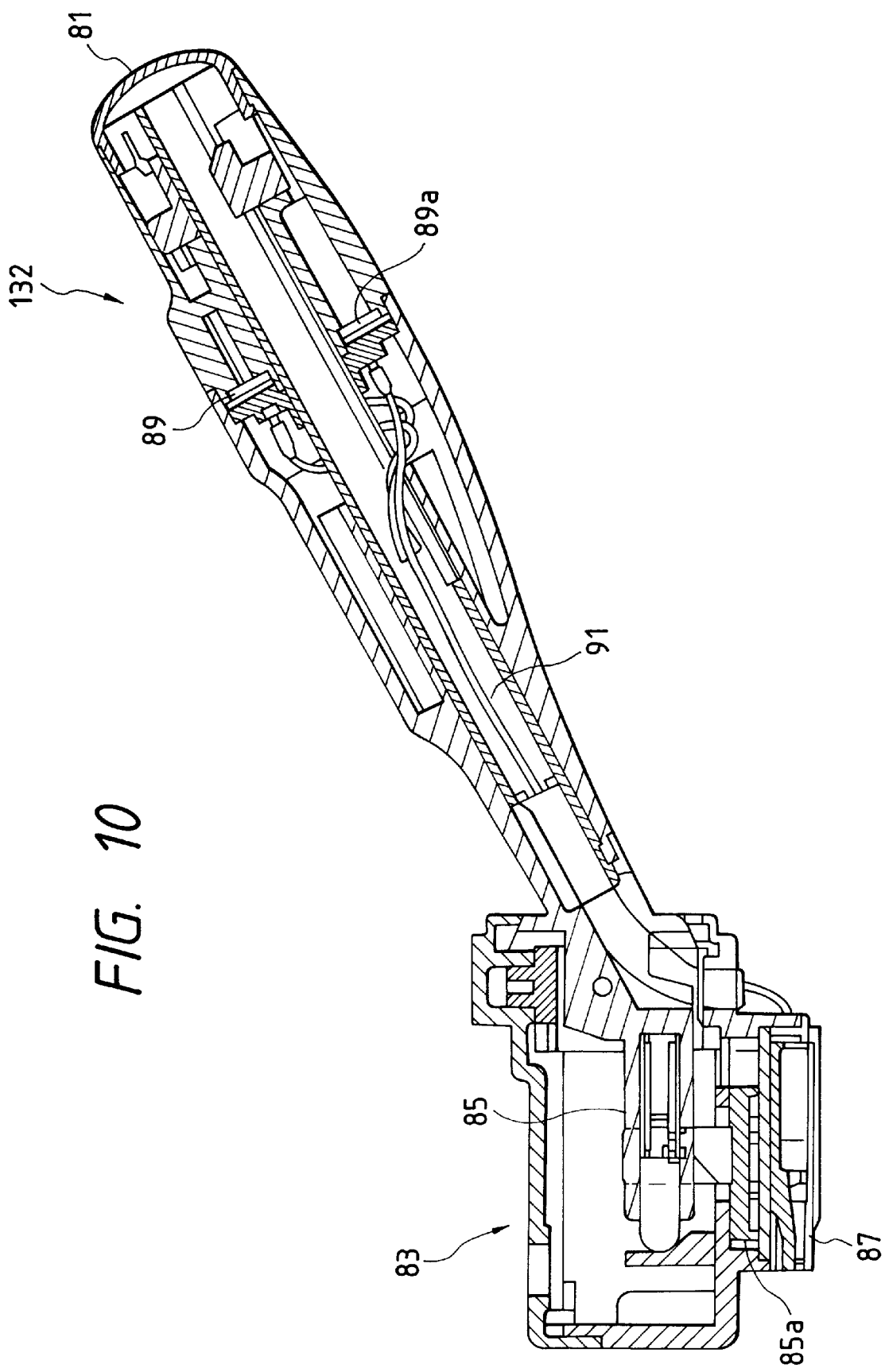
FIG. 10 is an enlarged sectional top view of a first lever switch shown in FIG. 8.
Figure 11:
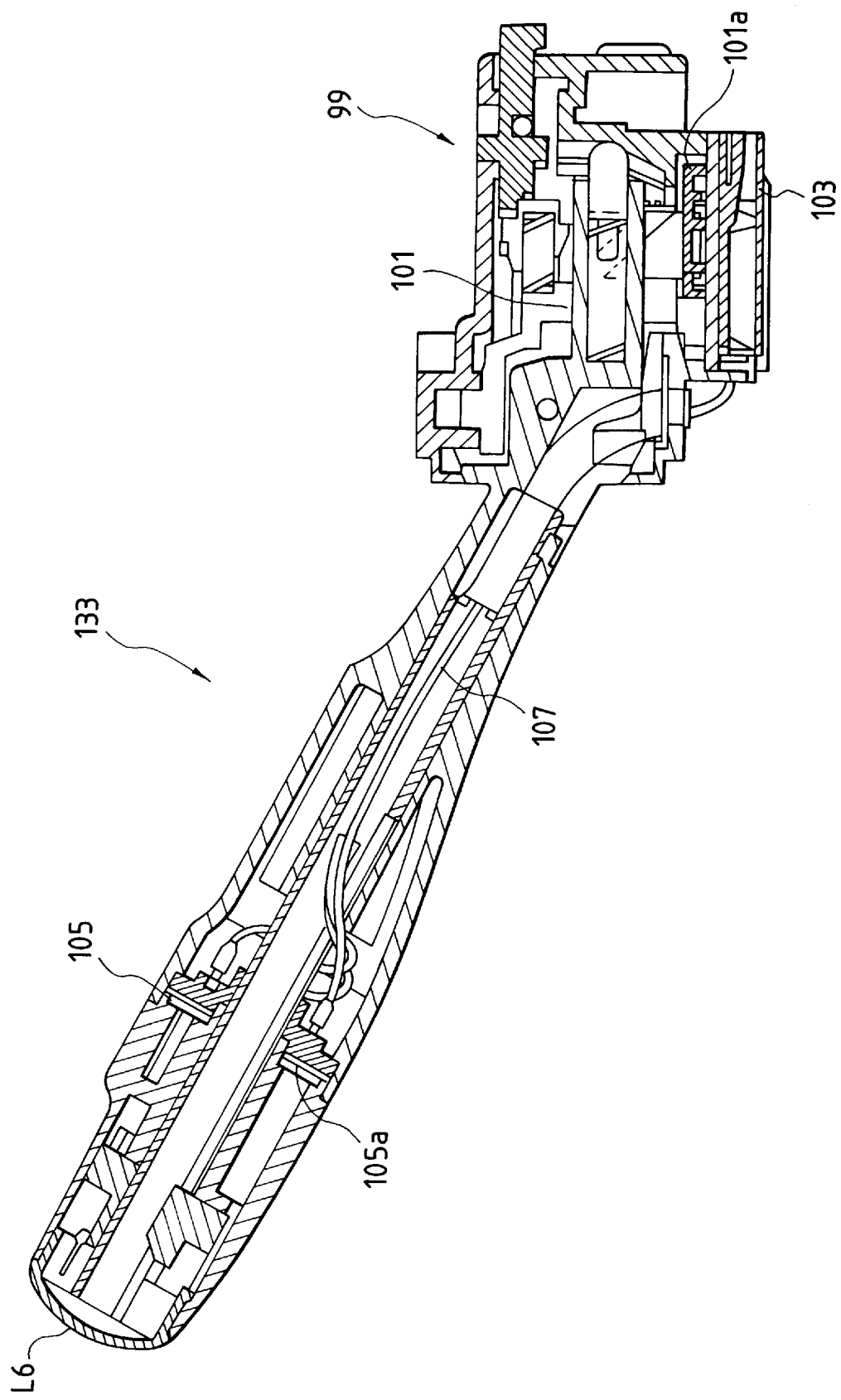
FIG. 11 is an enlarged sectional top view of a second lever switch shown in FIG. 8.

FIG. 8 is a sectional top view of the combination switch device, the second embodiment of the invention; FIG. 9 is a front view of the device shown in FIG. 8; FIG. 10 is an enlarged sectional top view of a first lever switch shown in FIG. 8, and FIG. 11 is an enlarged sectional top view of a second lever switch shown in FIG. 8.

In those figures, reference numeral 131 designates the combination switch device, the second embodiment of the invention. The device 131 has first and second lever switches 132 and 133, in which the contact substrates 89a and 105a of the first and second knob switch sections 89 and 105 are connected through lead wires 91 and 107 to first and second joining-side connecting terminals 87 and 103, respectively. Contact substrates 85a and 101a in first and second lever switch mechanism 85 and 101 are directly connected to the first and second joining-side connecting terminals 87 and 103 with connecting bars (not shown) or the like, respectively. The first and second joining-side connecting terminals 87 and 103 are connected to the first and second receiving-side connecting terminals 59 and 61 of the bus bars 45, respectively. As is apparent from the above description, roughly stated, the combination switch device, the second embodiment, is obtained by eliminating the first and second connectors 93 and 109 from the above-described first embodiment.

The first switch assembly 83 has a pair of guide protrusions 134 and 134 on its both side walls, and the second switch assembly 99 also has a pair of guide protrusions 134 and 134. Those guide protrusions 134 are slidably engaged with guide grooves (not shown) formed in the first and second switch assembly accommodating sections 51 and 53. The first switch assembly 83 has a pair of fixing arms 136 and 136 on both side walls, and the second switch assembly 99 also has a pair of fixing arms 136 and 136 on both side walls. Each of the fixing arms 136 is elastically flexible with its base end as fulcrum. Furthermore, those fixing arms have locking pawls which are engaged with locking sections 137 of the first and second switch assembly accommodating sections 51, 53.

As shown in FIG. 9, in the combination switch device 131, the first and second lever switches 132 and the first and second switch assembly accommodating sections 51 and 53 are symmetrical in configuration with respect to the device body 117. In FIG. 9, reference numeral 139 designates clock sprinting mounting sections. The other arrangements are equal to those of the above-described combination switch device 31, the first embodiment.

In the first embodiment, it is necessary to insert the first and second lever switches 35 sand 37 respectively into the first and second switch assembly accommodating sections 51 and 53, and thereafter to insert the first and second knob switch connectors 93 and 109 respectively into the control-unit-side connector 67 and the body-side connector 111. However, with the second embodiment, merely by inserting the first and second lever switches 132 and 133 respectively into the first and second switch assembly accommodating sections 51 and 53, all the switches can be connected to the control unit 39.

Hence, in the second embodiment, none of the first and second knob switch connectors 93 and 109 are employed, which decreases the number of components as much. In addition, merely by inserting the first and second lever switches 132 and 133 into the device body, the assembling of the combination switch device and the electrical connection of the latter are achieved at the same time. Hence, the second embodiment is high in assembling efficiency.

Furthermore, the first and second (or right and left) lever switches 132 and 133 are symmetrical in configuration with respect to the device body. This feature makes it possible to commonly use the right and left steering wheel components (such as the device body 33).

3rd Embodiment

Figure 12:
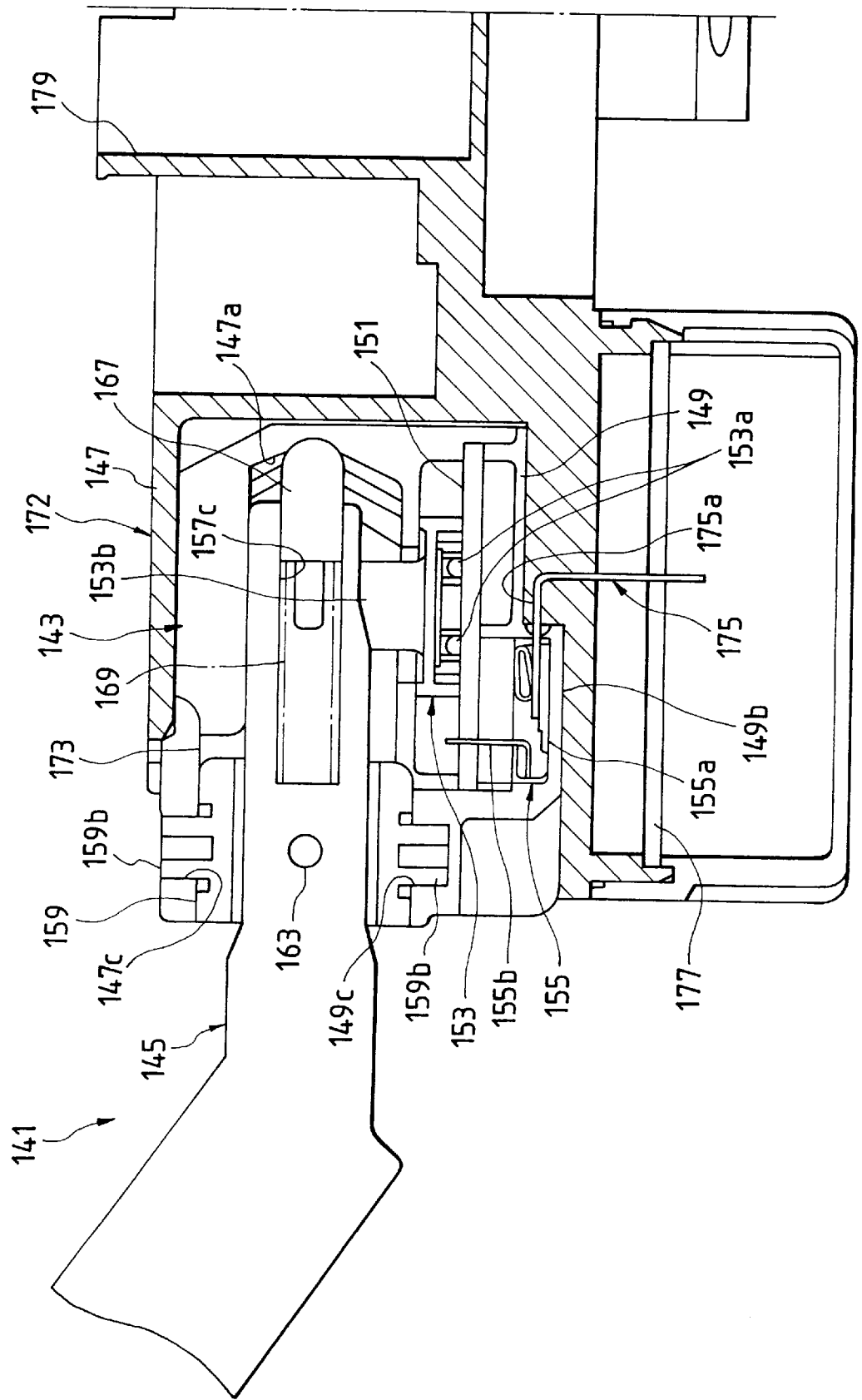
FIG. 12 is an enlarged sectional view of a switch assembly in another example of the combination switch device, which constitutes a third embodiment of the invention.
Figure 13:
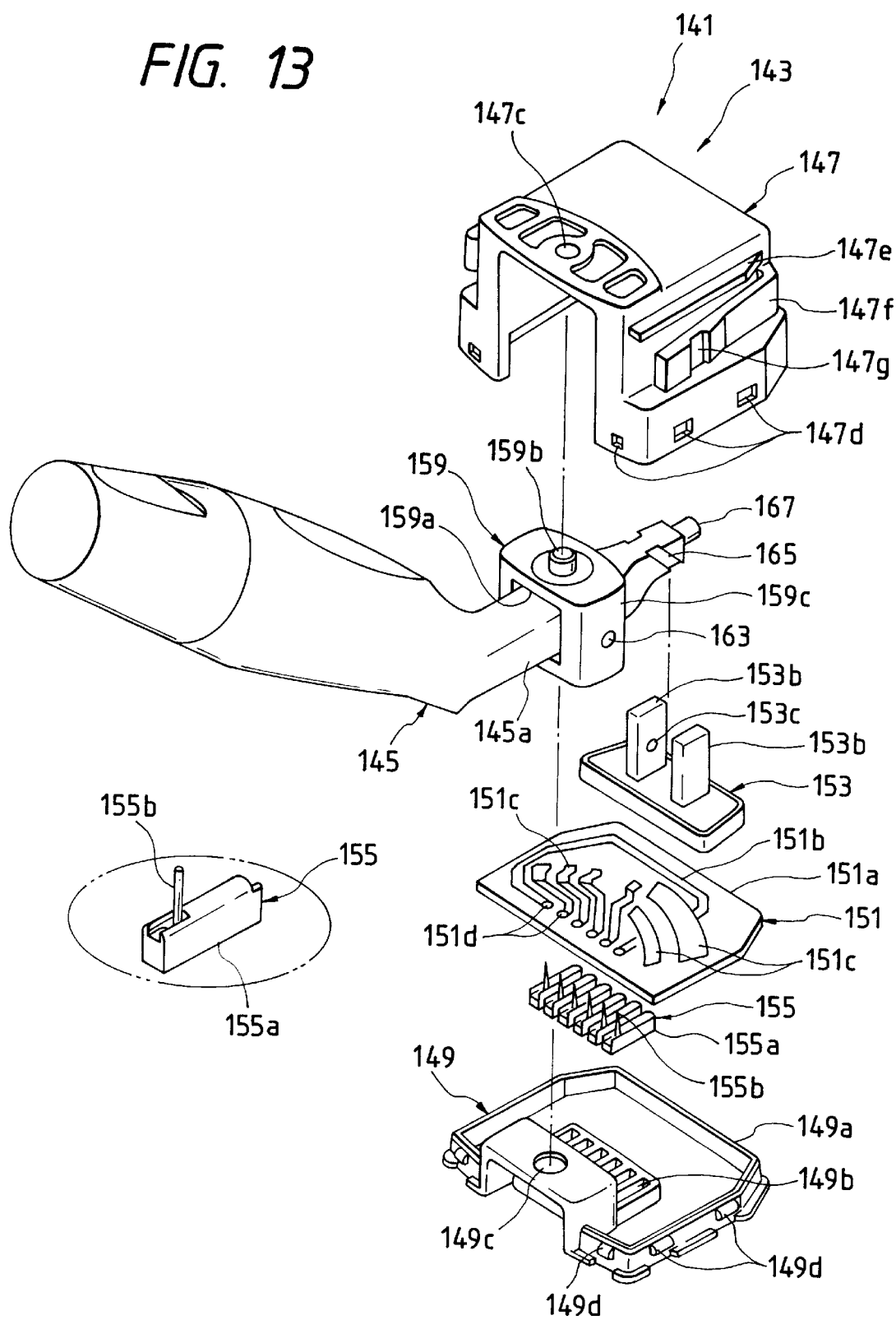
FIG. 13 is an exploded perspective view of the switch assembly shown in FIG. 12.
Figure 14:
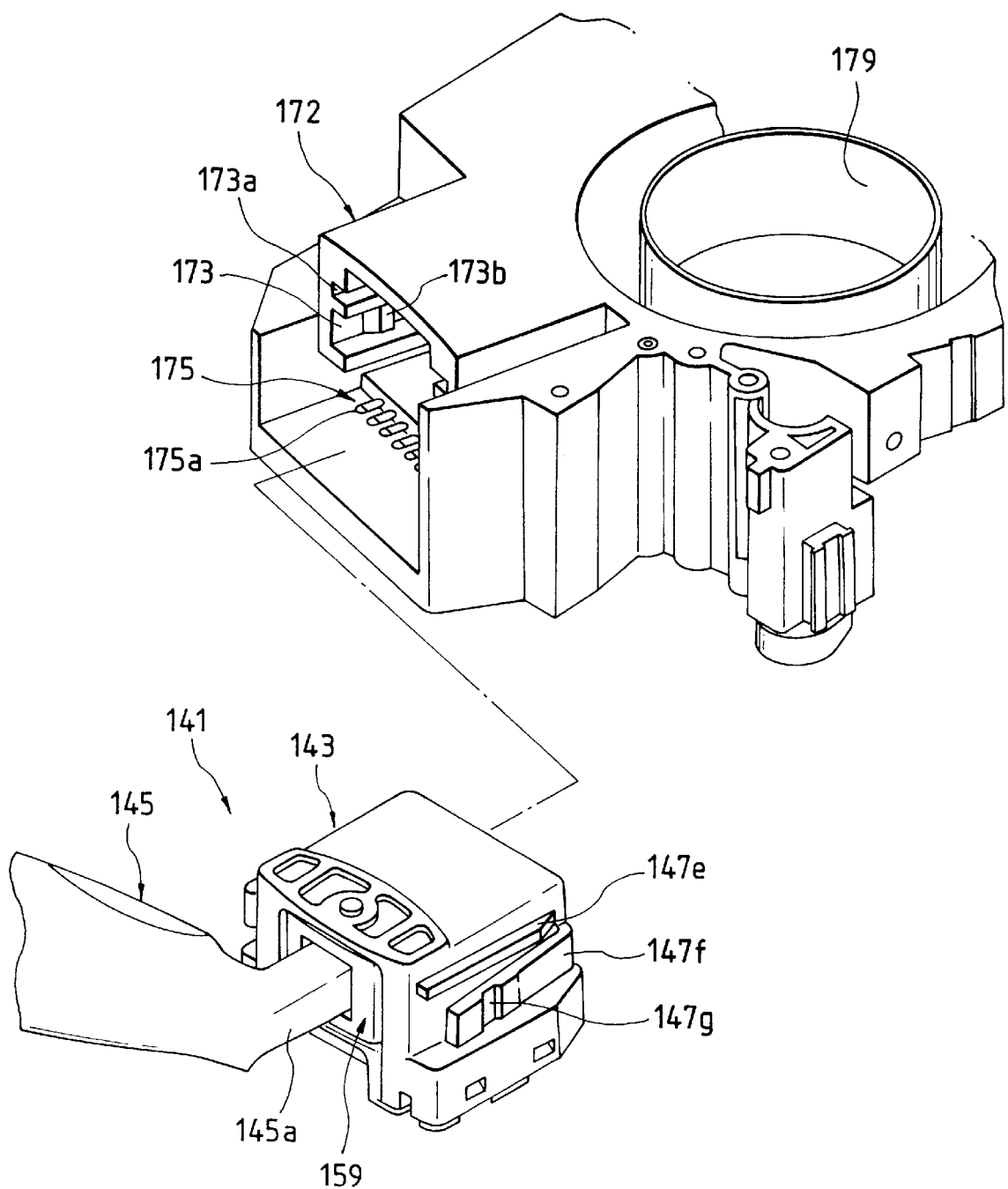
FIG. 14 is a perspective view showing the relationships between the switch assembly and a device body which are shown in FIG. 12.

Now, another example of the combination switch device, which constitutes a third embodiment of the invention, will be described. FIG. 12 is an enlarged sectional view of a switch assembly in the third embodiment, and FIG. 13 is an exploded perspective view of the switch assembly shown in FIG. 12, and FIG. 14 is a perspective view showing the relationships between the switch assembly shown in FIG. 12 and the device body. In the third embodiment, too, the first and second lever switches are symmetrical with respect to the device body. Hence, only one of the lever switches will be described as a typical example of them.

The switch assembly 141 comprises: a switch casing 143; and a lever switch 145 which is extended from the switch casing 143. The switch casing 143 is made up of the upper cover 147 and the lower cover 149. A lever switch mechanism is provided between those covers 147 and 149 which comprises a contact substrate (or switch-assembly-side circuit), a movable contact holder 153, and joining-side connecting terminals 155.

The contact substrate 151 is formed by providing a printed wires 151b on a hard substrate 151a. The printed wires 151b have stationary contacts 151c, and terminals 151d. The contact substrate 151 is so shaped that it is fitted in a frame 149a which is the peripheral wall of the lower cover 149. That is, the contact substrate 151 is fixedly held between the upper and lower covers 147 and 149 in such a manner that it is fixedly fitted in the frame 149a.

The movable contact holder 153 is coupled to the base end portion of the lever switch 145 (described later), and it is so designed that it is slid on the contact substrate 151 as the lever switch 145 is swung. That is, the movable contact holder 153 has movable contacts 153a (cf. FIG. 12) on the bottom. As the movable contacts 153a slide on the contact substrate 151, the stationary contacts 151c are electrically connected to or disconnected from each other. The movable contact holder 153 has two flat plates 153b and 153b which are extended from the body of the holder in such a manner they are in parallel with each other. In addition, a pair of protrusions 153 are extended from the inner surfaces of the flat plates 153b which are confronted with each other, respectively.

The joining-side connecting terminals 155 comprise: female terminals 155a which are-set in a plurality of terminal holders 149b; and connecting bars 155b which are extended from the female terminals 155a in such a manner that they form right angles with the latter. The connecting bars 155b are connected to the terminals 151d of the contact substrate 151 by soldering, respectively. As shown in FIG. 12, the female terminals 155a and the terminal holders 149b are protruded in such a manner that they are in parallel with the bottom of the lower cover 149.

As shown in FIG. 13, the base end portion 145a of the lever switch 145 is rectangular in section. The base end portion 145a is coupled to the switch casing 143 through a swinging coupling 159. The latter 159 has a rectangular hollow section 159a, into which the base end portion 145a rectangular in section of the lever switch 145 is inserted. The swinging coupling 159 has a pair of protruded shafts 159b respectively on the upper and lower surfaces at the center. Those protruded shafts 159b are rotatably engaged with supporting holes 147c and 149c which are formed in the upper cover 147 and the lower cover 149, respectively. That is, the protruded shafts 159b and 159b horizontally swingably support the swinging coupling 159 and the lever switch 145.

The swinging coupling 159 has a rotating pin 163 which penetrates the right and left walls 159c, and the base end portion 145a rectangular in section (hereinafter referred to as "a rectangular base end portion 145a", when applicable) of the lever switch 145. The rotating pin 163 supports the lever switch 145 in such a manner that the latter 145 is vertically swingable about the pin 163; however, it should be noted that the rotating pin 163 is fixed to the right and left walls 159c of the swinging coupling 159.

The rectangular base end portion 145a of the lever switch 45 has a pair of oblique grooves 165 with which the aforementioned protrusions 153c of the movable contact holder 153 are engaged. Hence, as the lever switch 145 is vertically swung, the movable contact holder 153 is slid on the contact substrate 151.

Furthermore, as shown in FIG. 12, the lever switch 145 has a hole 157c; more specifically the hole 157c is formed in the base end face of the lever switch 145 to a predetermined depth. And a detent pin 167 and a coil spring 169 are set in the hole 157c in such a manner that the coil spring 169 urges the detent pin 167 outwardly.

The upper cover 147 has a plurality of detent grooves 147a, so that, when the lever switch 145 is horizontally swung with the protrusions 159b as fulcrum, the detent pin 167 is engaged with one of the detent grooves 147a to maintain the angle of swing.

The upper cover 147, as shown in FIG. 13, has a plurality of locking holes 147d, and the lower cover 149 has a plurality of locking protrusions 149d which are engaged with the locking holes 147d of the upper cover. That is, the upper cover 147 and the lower cover 149 are positively coupled to each other in one action by engaging the locking protrusions 149d with the locking holes 147d. The upper cover 147 has elongated guide protrusions 147e and fixing arms 147f. The guide protrusions 149 are engaged with guide grooves 173a which are formed in an assembly accommodating section 173 of the device body 172 (cf. FIG. 14). Each of the fixing arms 147f is elastically flexible with its base end as fulcrum. Furthermore, each of the fixing arms 147f has a fixing groove 147g which is engaged with a fixing protrusion 173b of the assembly accommodating section 173 (described later).

On the other hand, the device body 172 has the aforementioned assembly accommodating section 173 into which the switch assembly 141 is inserted. The assembly accommodating section 173 is so shaped as to hold the switch casing 143, and has the guide grooves 173a in the inner surfaces of its side walls which are engaged with the elongated guide protrusions 147e of the switch casing 143. Furthermore, the assembly accommodating section 173 has the fixing protrusions 173b on the inner surfaces of the side walls. The fixing protrusions 173b are engaged with the fixing grooves 147g of the fixing arms 147f of the switch casing 143, to fixedly set the switch assembly 141 in the assembly accommodating section 173 of the device body 172.

The device body 172 has a plurality of receiving-side contact terminals 175 in the assembly accommodating section 173. The receiving-side contact terminals 175 are formed by bending the bus bars at right angles. First end portions of the receiving-side contact terminals 175 are male terminals 175a which are engaged with the female terminals 155a of the joining-side contact terminals 155, and the remaining end portions of the contact terminals 175 are connected to terminals of a control unit 177 (a circuit in the device body) provided in the device body 172. More specifically, the receiving-side contact terminals 175 are so designed that, when the switch assembly 141 is engaged with the assembly accommodating section 173, the male terminals 175a are engaged with the female terminals 155 of the joining-side contact terminals, so that the receiving-side contact terminals 175 are electrically connected to the joining-side contact terminals 155.

The device body 172 has a through-hole 179 to mount the device body on the steering column of the vehicle.

With the above-described combination switch device, the switch assembly 141 may be joined to the device body 172 merely by inserting the switch casing 143 into the assembly accommodating section 173 of the device body 172. In this operation, the switch casing 143 is inserted into the assembly accommodating section 173 with the elongated guide protrusions 147e of the switch casing 143 in alignment with the guide grooves 173 of the assembly accommodating section 173. As a result, the male terminals 175a of the receiving-side contact terminals 175 are engaged with the female terminals 155a of the joining-side contact terminals 155; that is, the joining-side contact terminals 155 are electrically connected to the receiving-side contact terminals 175. As the switching casing 143 is being inserted into the assembly accommodating section 173, the fixing arms 147f are elastically bent by the fixing protrusions 173b, and when the fixing grooves 147g reach the fixing protrusions 173b, the fixing arms 147f are elastically restored, so that the fixing protrusions 173b are engaged with the fixing grooves 147g, and accordingly the switch casing 143 is fixedly set in the assembly accommodating section 173.

That is, merely by joining the switch assembly 141 to the device body 172, the contact substrate 151 of the switch assembly 141 is electrically connected to the control unit 177 of the device body by soldering. Hence, the combination switch device of the invention dispenses with the lead wires and the connectors which are heretofore used to connect the circuit of the switch assembly to the circuit of the device body 172, and reduces the number of components as much. In addition, with the device, the manufacturing steps of connecting the lead wires to the connectors and of laying the lead wires are eliminated.

4th Embodiment

Figure 15:
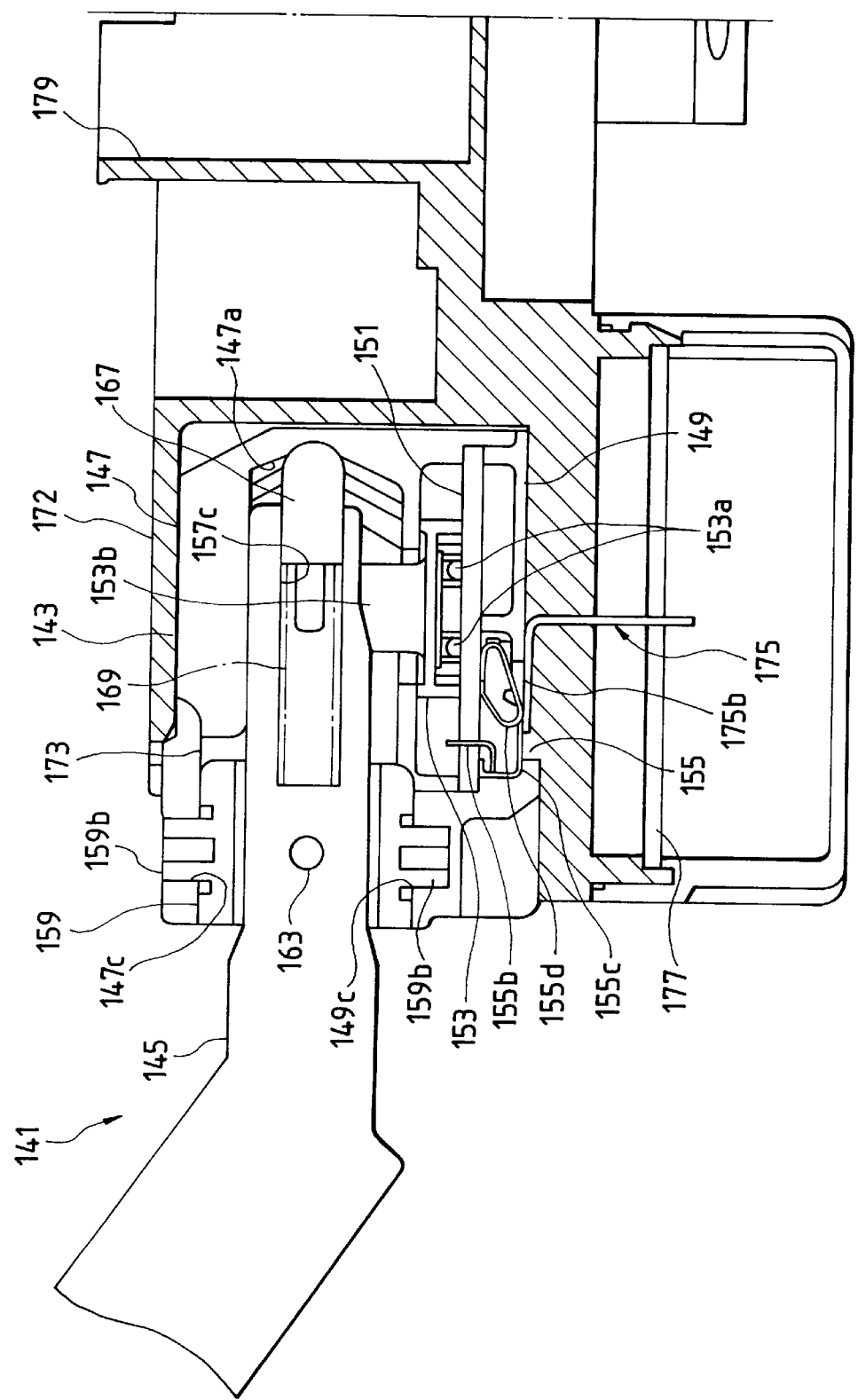
FIG. 15 is an enlarged sectional view of a switch assembly in another example of the combination switch device, which constitutes a fourth embodiment of the invention.
Figure 16:
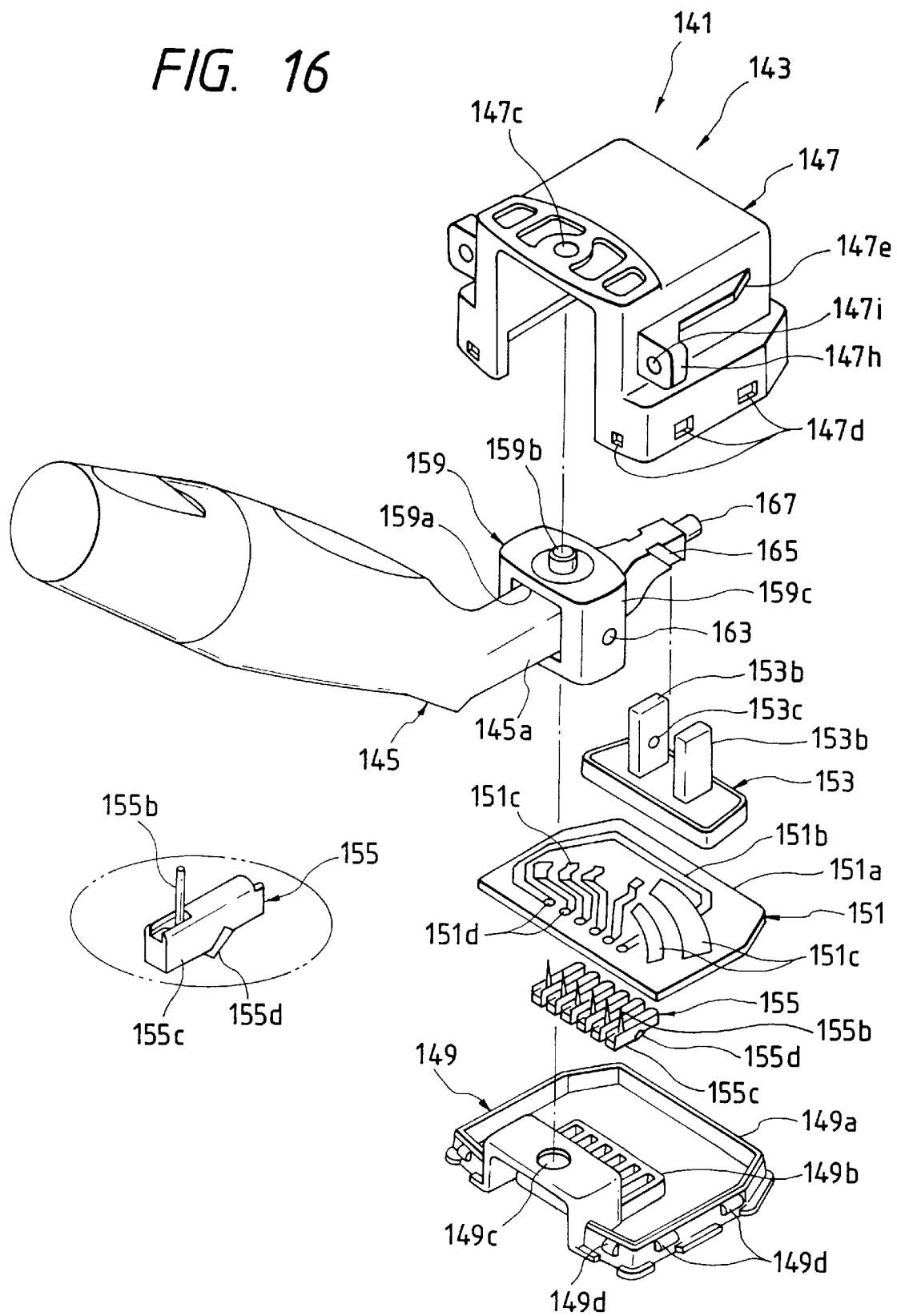
FIG. 16 is an exploded perspective view of the switch assembly shown in FIG. 15.
Figure 17:
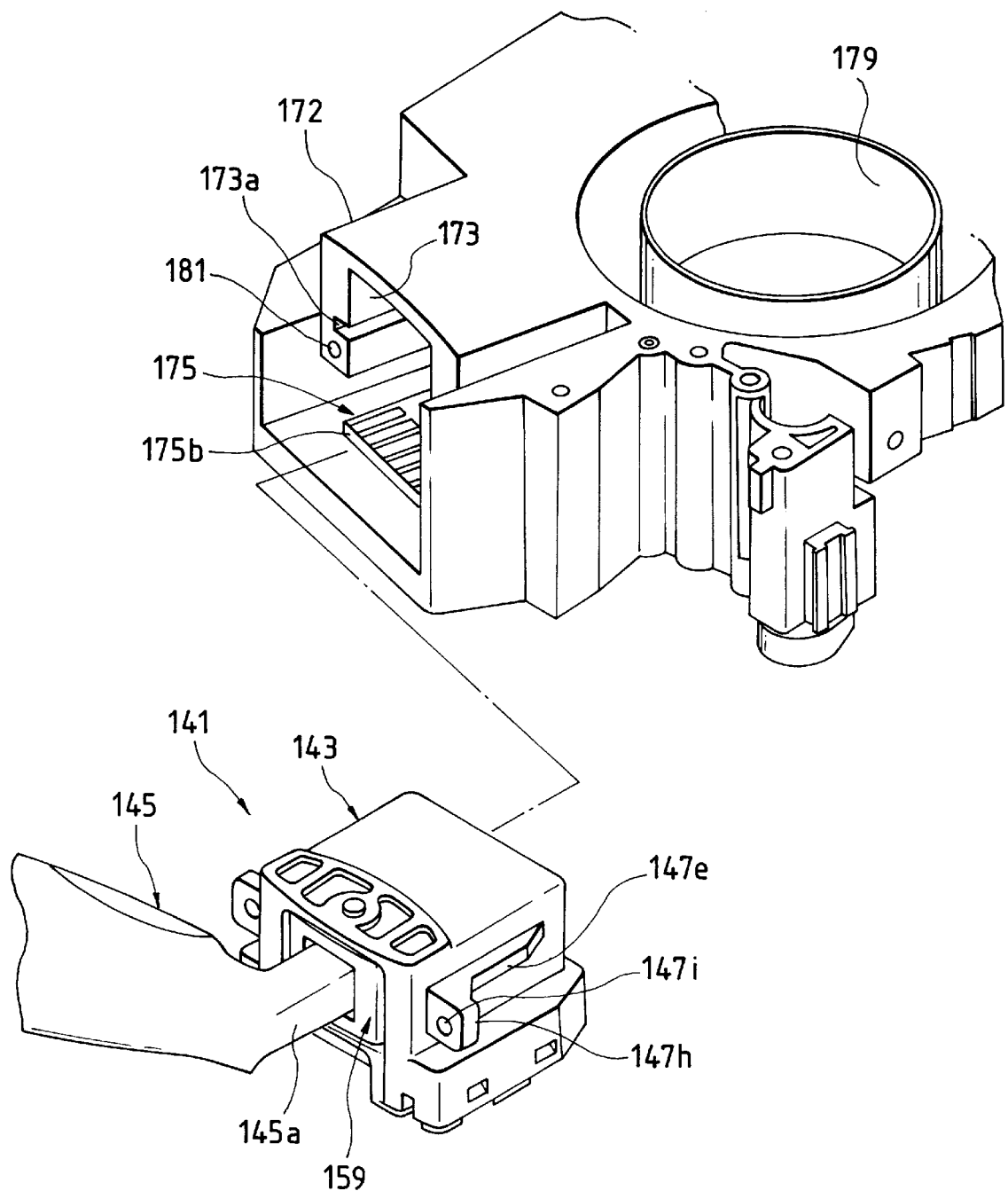
FIG. 17 is a perspective view showing the relationships between the switch assembly and a device body which are shown in FIG. 15.

Now, another example of the combination switch device, which constitutes a fourth embodiment of the invention, will be described with reference to FIGS. 15 to 17. FIG. 15 is an enlarged sectional view of a switch assembly in the combination switch device, and FIG. 16 is an exploded perspective view of the switch assembly shown in FIG. 15, and FIG. 17 is a perspective view showing the relationships between the switch assembly shown and a device body which are shown in FIG. 15. In those figure, parts corresponding functionally to those already described with reference to FIGS. 12 to 14 are therefore designated by the same reference numerals or characters.

The fourth embodiment is different from the third embodiment in the structures of the joining-side contact terminals 155 and the receiving-side contact terminal and in the means of fixing the switch casing 143 to the device body 172.

That is, the bodies 155c of the joining-side contact terminals 155, as shown in FIGS. 15 and 16, are fixedly set in the terminal holding sections 149b of the lower cover 149. The connecting bars 155b are extended from the terminal bodies 155c in such a manner that the former 155b form right angles with the latter 155c. In addition, the bodies 155c have contact pieces 155d extending downwardly from the terminal holding sections 149b. The contact pieces 155d are brought into contact with contact sections 175b of the receiving-side connecting terminals 175 while being elastically bent.

The receiving-side connecting terminals 175, as shown in FIGS. 15 and 17, are formed by bending bus bars at right angles. First end portions of-the receiving-side connecting terminals 175 are the aforementioned contact sections 175b which appear in one inner side surface of the assembly accommodating section 173, and the remaining end portions are connected to the control unit 177 of the device body 172 by soldering. In the assembly accommodating section 173, the contact sections 175b are positioned in correspondence to the positions of the contact pieces 155d of the switch casing 143.

On the other hand, the upper cover 147, as shown in FIG. 16, has a pair of brackets 147h for securing the switch casing 143 to the device body 172. The brackets 147h have through-holes 147i, into which bolts (not shown), are inserted, respectively. The device body 172 has threaded holes 181 at positions which are in correspondence to the positions of the through-holes 147i of the brackets 147h when the switch casing 143 is inserted into the assembly accommodating section 173.

With the combination switch device thus constructed, as the switch casing 143 is inserted into the assembly accommodating section 173, the contact pieces 155d of the joining-side connecting terminals 155 are slidably engaged with the contact pieces 175b of the receiving-side contact terminals 175, so that the joining-side connecting terminals 155 are brought in contact with the receiving-side connecting terminals 175. The contact pieces 175b of the receiving-side contact terminals 175 are stably held in a part of the assembly accommodating section 173 because they appear in one inner side surface of the assembly accommodating section 173 as described above. That is, the contact pieces 175b are prevented from being bent for instance, so that the joining-side connecting terminals 155 can be positively connected to the receiving-side connecting terminals 175.

Screws are inserted into the through-holes 147i of the brackets 147h, and then threadably engaged with the threaded holes 181 of the device body 172, to positively secure the switch casing 143 to the device body 172.

5th Embodiment

Figure 18:
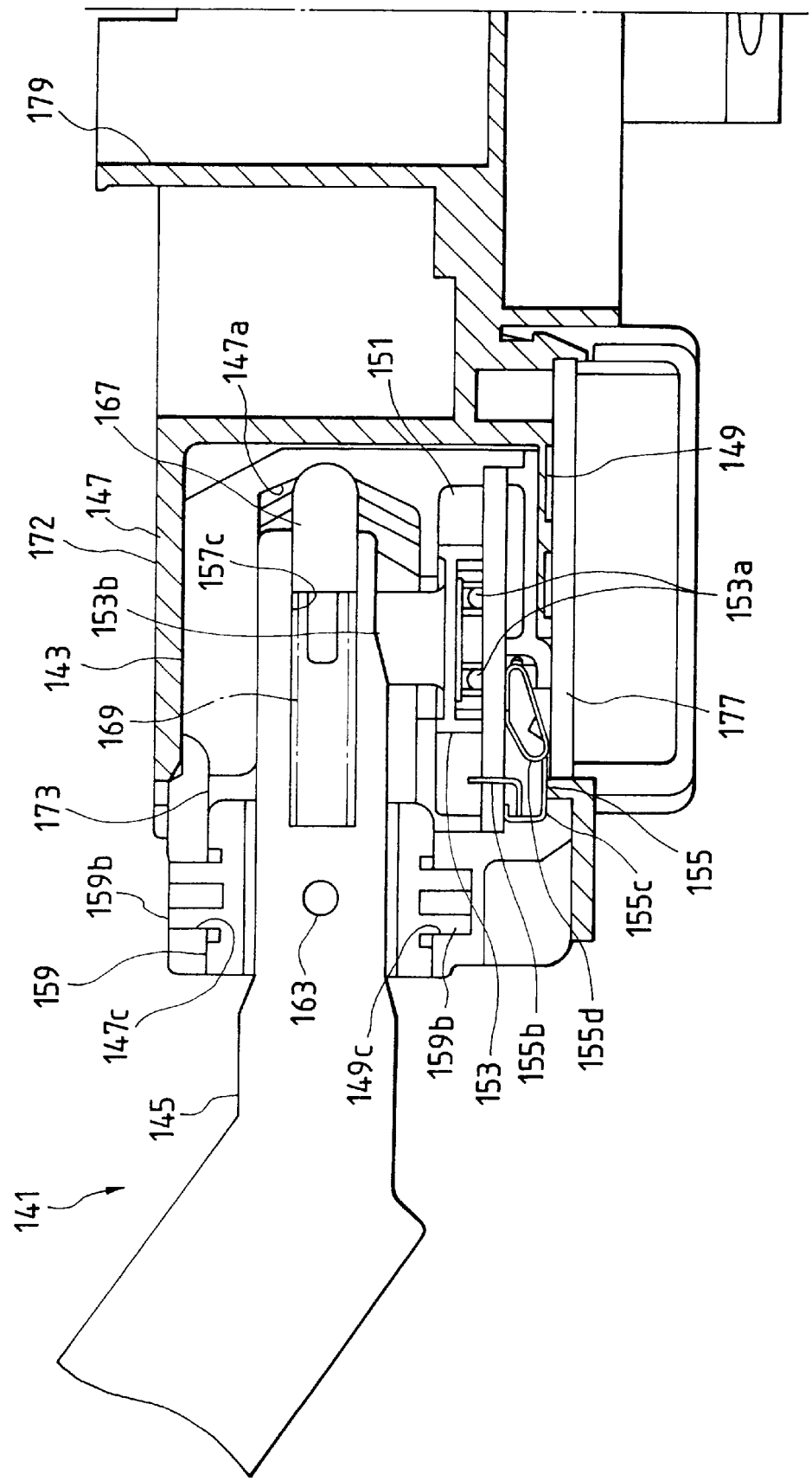
FIG. 18 is an enlarged sectional view of a switch assembly in another example of the combination switch device, which constitutes a fifth embodiment of the invention.
Figure 19:
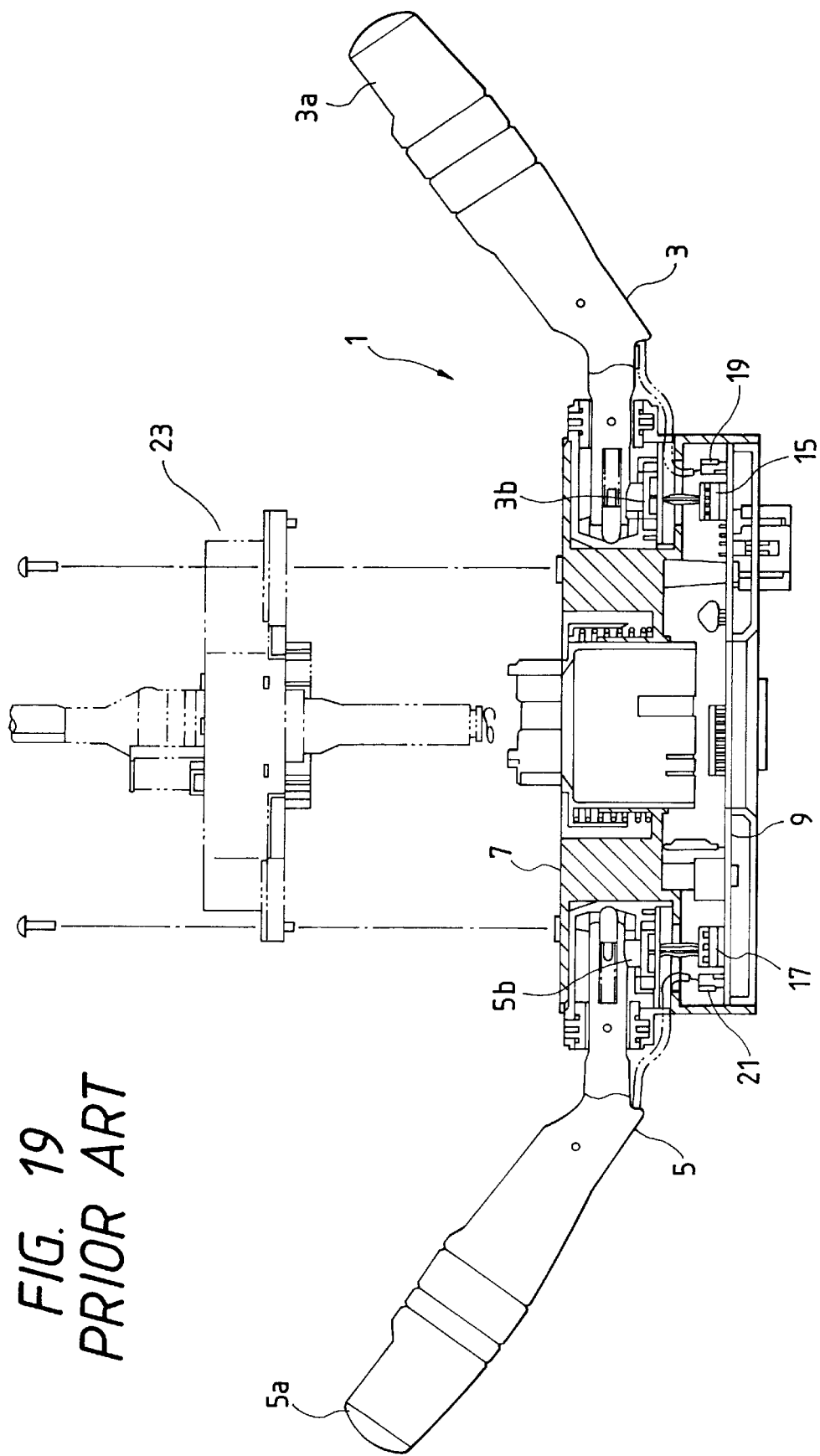
FIG. 19 is an exploded sectional top view of a conventional combination switch device.

Another example of the combination switch device, which constitutes a fifth embodiment of the invention, will be described with reference to FIG. 18. FIG. 18 is an enlarged sectional view of the combination switch device, the fifth embodiment of the invention. In FIG. 18, parts corresponding functionally to those already described with reference to the fourth embodiment are therefore designated by the same reference numerals or characters.

The fifth embodiment is different from the fourth embodiment in that the receiving-side connecting terminals are provided on the control unit 177.

That is, the control unit 177 is so provided on the device body 172 as to form one side wall of the assembly accommodating section 173. The control unit 177 has printed wires, parts of which are the receiving-side connecting terminals (not shown). On the other hand, the contact pieces 155d of the joining-side connecting terminals 155 are brought into contact with the above-described receiving-side connecting terminals while being elastically bent when the switch casing 143 is inserted into the assembly accommodating section 173.

With the combination switch device thus constructed, as the switch casing 143 is inserted into the assembly accommodating section 173, the contact pieces 155d of the joining-side connecting terminals 155 are slidably engaged with the receiving-side connecting terminals; that is, the joining-side connecting terminals 155 are electrically connected to the receiving-side connecting terminals. As described above, the receiving-side connecting terminals are provided on the control unit 175; that is, they are stably held on the control unit 175. This feature prevents the receiving-side connecting terminals from being bent for instance, positively connects the joining-side connecting terminals 155 to the receiving-side connecting terminals.

In the fifth embodiment, the receiving-side connecting terminals 177 are integral with the control unit 177 (the terminals 177 being integral with the control unit 177 in the fourth embodiment), which reduces the number of components as much, and eliminates the manufacturing steps of mounting the receiving-side connecting terminals on the device body 172 and connecting them to the control unit 177.

As described above, in the combination switch device of the invention, the wiring bus bars are built in the device body, and the control unit is connected to the bus bars, so that, when the lever switches are coupled to the device body, the joining-side connecting terminals are automatically electrically connected to the bus bars. Therefore, the mechanical joining of the switch levers to the device body, and the electrical connecting of the lever switches to the control unit can be achieved at the same time. Hence, the combination switch device of the invention, compared with the conventional one, is high in assembling efficiency, small in the number of components, and low in manufacturing cost.

In the case where the clock spring is made integral with the device body, the use of the clock spring components and the mounting screws therefor can be eliminated, which contributes to a reduction of the number of components.

Furthermore, in the combination switch device in which the knob switch section and the lever switch mechanism are electrically connected to the bus bars through the joining-side connecting terminals, the electrical connection of the lever switch can be achieved only by the engagement of the lever switch with the device body.

Furthermore, in the combination switch device in which a pair of lever switches are formed symmetrical with respect to the device body, the right and left steering wheel components can be used commonly.

In addition, in the combination switch device in which the receiving-side connecting contacts are formed on the circuit board of the control unit, it is unnecessary to provide the receiving-side connecting contacts as individual components, because the receiving-side connecting contacts are integral with the circuit board of the control unit. Hence, the number of components is reduced as much.

What is claimed is:

1. A combination switch device for automobiles comprising:
   a switch body for mounting on an automobile steering wheel shaft, said switch body fixedly incorporating wiring and connecting means;
   at least one lever switch incorporating at least one joining-side connecting terminal for electrically connecting said lever switch, said lever switch being detachably engaged with said switch body, said joining-side connecting terminal being electrically connected to said wiring and connecting means when said lever switch is engaged with said switch body; and
   a control unit connected to said wiring and connecting means for receiving output signals from said joining-side connecting terminal of said lever switch via said wiring and connecting means.

2. A combination switch device as claimed in claim 1, wherein said control unit is detachable from said switch body.

3. A combination switch device as claimed in claim 1, wherein said wiring and connecting means is an insert-molded bus bar in said switch body.

4. A combination switch device as claimed in claim 1, wherein said switch body further includes a clock spring for absorbing rotational forces of the motion of an automobile steering wheel.

5. A combination switch device as claimed in claim 1, wherein said lever switch further includes a knob switch section for generating knob switch signals for receiving by said control unit and a lever switch mechanism, wherein said lever switch mechanism generates said lever switch signals.

6. A combination switch device as claimed in claim 5, wherein said knob switch section and lever switch mechanism are electrically connected through said joining-side connecting terminal to said wiring and connecting means.

7. A combination switch device as claimed in claim 1, wherein said switch body includes a pair of accommodating sections on said automobile steering wheel shaft, each accommodating section located so as to be symmetrical to the other accommodating section with respect to said switch body and wherein each of a pair of symmetrical lever switches are engaged with said accommodating sections, respectively.

8. A combination switch device as claimed in claim 4, wherein said switch body includes a pair of accommodating sections on said automobile steering wheel shaft, each accommodating section located so as to be symmetrical to the other accommodating section with respect to said switch body and wherein each of a pair of symmetrical lever switches are engaged with said accommodating sections, respectively.

9. A combination switch device as claimed in claim 6, wherein said switch body includes a pair of accommodating sections on said automobile steering wheel shaft, each accommodating section located so as to be symmetrical to the other accommodating section with respect to said switch body and wherein each of a pair of symmetrical lever switches are engaged with said accommodating sections, respectively.

10. A combination switch device as claimed in claim 1, wherein said wiring and connecting means includes a receiving-side connecting terminal formed on said control unit and wherein said joining-side connecting terminal is slidably connected to said receiving-side connecting terminal so that said joining-side connecting terminal slides on said receiving-side connecting terminal when said lever switch is engaged with said switch body.

11. A combination switch device as claimed in claim 7, wherein said wiring and connecting means includes a receiving-side connecting terminal formed on said control unit and wherein said joining-side connecting terminal is slidably connected to said receiving-side connecting terminal so that said joining-side connecting terminal slides on said receiving-side connecting terminal when said lever switch is engaged with said switch body.

12. A combination switch device as claimed in claim 8, wherein said wiring and connecting means includes a receiving-side connecting terminal formed on said control unit and wherein said joining-side connecting terminal is slidably connected to said receiving-side connecting terminal so that said joining-side connecting terminal slides on said receiving-side connecting terminal when said lever switch is engaged with said switch body.

13. A combination switch device as claimed in claim 9, wherein said wiring and connecting means includes a receiving-side connecting terminal formed on said control unit and wherein said joining-side connecting terminal is slidably connected to said receiving-side connecting terminal so that said joining-side connecting terminal slides on said receiving-side connecting terminal when said lever switch is engaged with said switch body.

* * * * *